(12) United States Patent
Yang et al.

(10) Patent No.: US 11,019,490 B2
(45) Date of Patent: May 25, 2021

(54) GROUP MANAGEMENT IN RECONFIGURABLE MACHINE-TO-MACHINE SYSTEMS

(71) Applicant: Intel Corporation, Santa Clara, CA (US)

(72) Inventors: Shao-Wen Yang, San Jose, CA (US); Meiyuan Zhao, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 4 days.

(21) Appl. No.: 16/306,558

(22) PCT Filed: Jul. 1, 2016

(86) PCT No.: PCT/US2016/040608
§ 371 (c)(1),
(2) Date: Dec. 1, 2018

(87) PCT Pub. No.: WO2018/004637
PCT Pub. Date: Jan. 4, 2018

(65) Prior Publication Data
US 2019/0296967 A1 Sep. 26, 2019

(51) Int. Cl.
*H04W 12/06* (2021.01)
*H04W 4/70* (2018.01)
(Continued)

(52) U.S. Cl.
CPC ......... *H04W 12/06* (2013.01); *H04L 41/0672* (2013.01); *H04L 41/0816* (2013.01);
(Continued)

(58) Field of Classification Search
CPC ............. H04L 41/0672; H04L 41/0816; H04L 41/0893; H04L 63/0492; H04L 63/08;
(Continued)

(56) References Cited

U.S. PATENT DOCUMENTS 8,621,569 B1 * 12/2013 Ewing ................ H04L 67/1097
380/247
10,015,286 B1 * 7/2018 Costlow ............. H04L 67/2814
(Continued)

FOREIGN PATENT DOCUMENTS

CN 102238146 A 11/2011
CN 105491025 A 4/2016
(Continued)

OTHER PUBLICATIONS

International Search Report dated Mar. 28, 2017 for PCT/US2016/040608, 3 pages.
(Continued)

*Primary Examiner* — Tauqir Hussain
(74) *Attorney, Agent, or Firm* — Alliance IP, LLC

(57) ABSTRACT

A registrar device is delegated enrollment authority for a group by a group authority. The registrar device identifies a particular asset device in association with a reconfiguration of a machine-to-machine (M2M) system that includes the group. The registrar device identifies an enrollment request for enrollment of the particular asset device within the group of devices in association with the reconfiguration of the M2M system and communicates with the particular device to initiate enrollment of the particular device within the group of devices, where enrollment of the particular device includes provisioning the particular device with a group access credential.

20 Claims, 20 Drawing Sheets

(51) Int. Cl.
*H04L 12/24* (2006.01)
*H04L 29/06* (2006.01)
*H04W 4/08* (2009.01)
*H04L 12/18* (2006.01)
*H04W 4/06* (2009.01)

(52) U.S. Cl.
CPC ...... *H04L 41/0893* (2013.01); *H04L 63/0492* (2013.01); *H04L 63/08* (2013.01); *H04W 4/08* (2013.01); *H04W 4/70* (2018.02); *H04L 12/185* (2013.01); *H04W 4/06* (2013.01)

(58) Field of Classification Search
CPC ........... H04W 4/70; H04W 4/08; H04W 4/06; H04W 12/70
USPC ........................................................ 709/221
See application file for complete search history.

(56) References Cited

U.S. PATENT DOCUMENTS

| | | | | |
|---|---|---|---|---|
| 2010/0162036 | A1* | 6/2010 | Linden | G06F 11/181 714/4.11 |
| 2011/0137991 | A1* | 6/2011 | Russell | G06Q 10/06 709/204 |
| 2011/0268047 | A1 | 11/2011 | Nath et al. | |
| 2013/0343323 | A1 | 12/2013 | Kang et al. | |
| 2014/0233514 | A1 | 8/2014 | Lee et al. | |
| 2016/0094485 | A1 | 3/2016 | Choi et al. | |
| 2019/0173955 | A1* | 6/2019 | Bachar | H04L 67/12 |
| 2019/0303373 | A1* | 10/2019 | Patel | G06F 11/20 |

FOREIGN PATENT DOCUMENTS

| | | |
|---|---|---|
| EP | 2903321 A1 | 8/2015 |
| WO | 2013180357 A1 | 12/2013 |
| WO | 2015080515 A1 | 6/2015 |

OTHER PUBLICATIONS

Written Opinion of the International Searching Authority dated Mar. 28, 2017 for PCT/US2016/040608, 5 pages.

International Preliminary Report on Patentability for PCT Application No. PCT/US2016/040608, dated Jan. 1, 2019, 7 pages.

SIPO; First Office Action issued in CN Patent Application No. 201680086577.6, dated Feb. 3, 2021; 12 pages without English translation.

* cited by examiner

1010

*GA*: parse message M5 as *sid*, $id_E$
*GA*: verify *sid* is the same as in message M4
*GA*: verify $id_E$ is the same as in token β
*GA*: $kck := prf(k, 1 \| sid)$
*GA*: validate integrity of message M5
*GA*: $K_E := prf(k, 2 \| sid)$, keep *sid* as key indentifier
*GA*: delete *k*, *kck*

GROUP MANAGEMENT IN RECONFIGURABLE MACHINE-TO-MACHINE SYSTEMS

CROSS-REFERENCE TO RELATED APPLICATIONS

This application is a national stage application under 35 U.S.C. § 371 of PCT International Application Serial No. PCT/US2016/040608, filed on Jul. 1, 2016, and entitled GROUP MANAGEMENT IN RECONFIGURABLE MACHINE-TO-MACHINE SYSTEMS. The disclosure of the prior application is considered part of and is hereby incorporated by reference in its entirety in the disclosure of this application.

TECHNICAL FIELD

This disclosure relates in general to the field of computer systems and, more particularly, to management of machine-to-machine systems.

BACKGROUND

The Internet has enabled interconnection of different computer networks all over the world. While previously, Internet-connectivity was limited to conventional general purpose computing systems, ever increasing numbers and types of products are being redesigned to accommodate connectivity with other devices over computer networks, including the Internet. For example, smart phones, tablet computers, wearables, and other mobile computing devices have become very popular, even supplanting larger, more traditional general purpose computing devices, such as traditional desktop computers in recent years. Increasingly, tasks traditionally performed on a general purpose computers are performed using mobile computing devices with smaller form factors and more constrained features sets and operating systems. Further, traditional appliances and devices are becoming "smarter" as they are ubiquitous and equipped with functionality to connect to or consume content from the Internet. For instance, devices, such as televisions, gaming systems, household appliances, thermostats, automobiles, watches, have been outfitted with network adapters to allow the devices to connect with the Internet (or another device) either directly or through a connection with another computer connected to the network. Additionally, this increasing universe of interconnected devices has also facilitated an increase in computer-controlled sensors that are likewise interconnected and collecting new and large sets of data. The interconnection of an increasingly large number of devices, or "things," is believed to foreshadow a new era of advanced automation and interconnectivity, referred to, sometimes, as the Internet of Things (IoT).

BRIEF DESCRIPTION OF THE DRAWINGS

FIGS. 8A-8C, FIG. 9, and FIGS. 10A-10B are process flow diagrams illustrating actions taken by an enrollee device, a delegated registrar device, and a group authority device, respectively, in carrying out a device-enrollment protocol according to at least some embodiments;

Like reference numbers and designations in the various drawings indicate like elements.

DETAILED DESCRIPTION OF EXAMPLE EMBODIMENTS

Figure 1A:
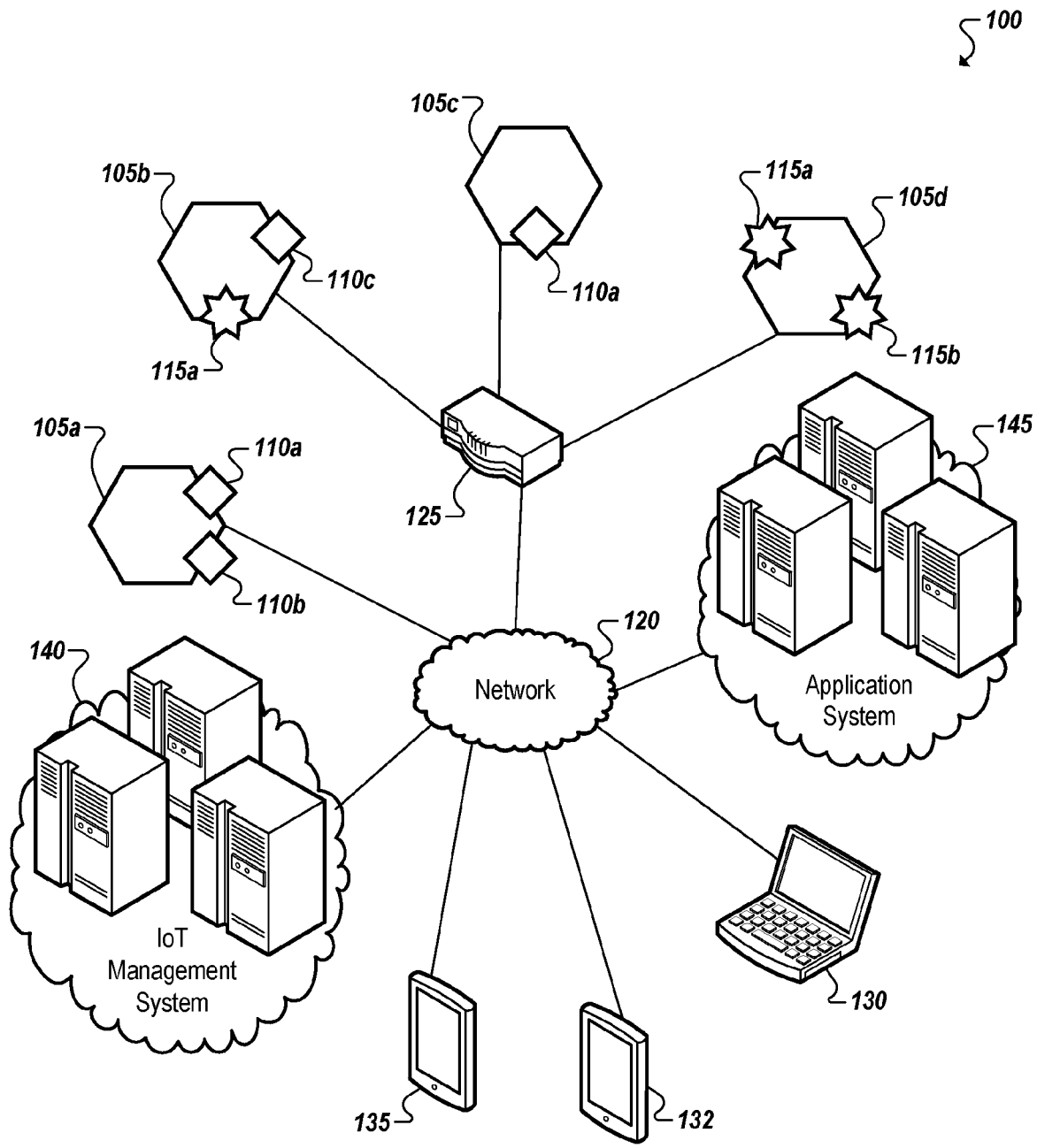
FIG. 1A illustrates an embodiment of a system including multiple sensor devices and an example data management system.

FIG. 1A is a block diagram illustrating a simplified representation of a system 100 that includes one or more devices 105a-d, or assets, deployed throughout an environment. Each device 105a-d may include a computer processor and/or communications module to allow each device 105a-d to interoperate with one or more other devices (e.g., 105a-d) or systems in the environment. Each device can further include one or more instances of various types of sensors (e.g., 110a-c), actuators (e.g., 115a-b), storage, power, computer processing, and communication functionality which may be leveraged and utilized (e.g., by other devices or software) within a machine-to-machine, or Internet of Things (IoT) system or application. Sensors are capable of detecting, measuring, and generating sensor data describing characteristics of the environment in which they reside, are mounted, or are in contact with. For instance, a given sensor (e.g., 110a-c) may be configured to detect one or more respective characteristics such as movement, weight, physical contact, temperature, wind, noise, light, computer communications, wireless signals, position, humidity, the presence of radiation, liquid, or specific chemical compounds, among several other examples. Indeed, sensors (e.g., 110a-c) as described herein, anticipate the development of a potentially limitless universe of various sensors, each designed to and capable of detecting, and generating corresponding sensor data for, new and known environmental characteristics. Actuators (e.g., 115a-b) can allow the device to perform some kind of action to affect its environment. For instance, one or more of the devices (e.g., 105b, d) may include one or more respective actuators that accepts an input and perform its respective action in response. Actuators can include controllers to activate additional functionality, such as an actuator to selectively toggle the power or operation of an alarm, camera (or other sensors), heating, ventilation, and air conditioning (HVAC) appliance, household appliance, in-vehicle device, lighting, among other examples.

In some implementations, sensors 110a-c and actuators 115a-b provided on devices 105a-d can be incorporated in and/or embody an Internet of Things (IoT) or machine-to-machine (M2M) system. A single physical device (e.g., 105b) may potentially include multiple sensors and/or actuators (e.g., 105c, 110a). In some cases, the physical device (e.g., 105b) may be considered a single endpoint within a M2M network. In other cases, the individual sensors or actuators (on a single device) may be considered discrete endpoints for purposes of the M2M network. M2M and IoT systems can refer to new or improved ad-hoc systems and networks composed of multiple different endpoints interoperating and synergizing to deliver one or more results or deliverables. Such ad-hoc systems are emerging as more and more products and equipment evolve to become "smart" in that they are controlled or monitored by computing processors and provided with facilities to communicate, through computer-implemented mechanisms, with other computing devices (and products having network communication capabilities). For instance, IoT systems can include networks built from sensors and communication modules integrated in or attached to "things" such as equipment, toys, tools, vehicles, etc. and even living things (e.g., plants, animals, humans, etc.). In some instances, an IoT system can develop organically or unexpectedly, with a collection of sensors monitoring a variety of things and related environments and interconnecting with data analytics systems and/or systems controlling one or more other smart devices to enable various use cases and application, including previously unknown use cases. Further, IoT systems can be formed from devices that hitherto had no contact with each other, with the system being composed and automatically configured spontaneously or on the fly (e.g., in accordance with an IoT application defining or controlling the interactions). Further, IoT systems can often be composed of a complex and diverse collection of connected devices (e.g., 105a-d), such as devices sourced or controlled by varied groups of entities and employing varied hardware, operating systems, software applications, and technologies.

Facilitating the successful interoperability of such diverse systems is, among other example considerations, an important issue when building or defining an IoT system. Software applications can be developed to govern how a collection of IoT devices can interact to achieve a particular goal or service. In some cases, the IoT devices may not have been originally built or intended to participate in such a service or in cooperation with one or more other types of IoT devices. Indeed, part of the promise of the Internet of Things is that innovators in many fields will dream up new applications involving diverse groupings of the IoT devices as such devices become more commonplace and new "smart" or "connected" devices emerge. However, the act of programming, or coding, such IoT applications may be unfamiliar to many of these potential innovators, thereby limiting the ability of these new applications to be developed and come to market, among other examples and issues.

As shown in the example of FIG. 1A, multiple IoT endpoints (or "devices") (e.g., 105a-d) can be provided from which one or more different IoT applications can be built. For instance, a device (e.g., 105a-d) can include such examples as a mobile personal computing device, such as a smart phone or tablet device, a wearable computing device (e.g., a smart watch, smart garment, smart glasses, smart helmet, headset, etc.), purpose-built devices such as and less conventional computer-enhanced products such as home, building, vehicle automation devices (e.g., smart heat-ventilation-air-conditioning (HVAC) controllers and sensors, light detection and controls, energy management tools, etc.), smart appliances (e.g., smart televisions, smart refrigerators, etc.), and other examples. Some devices can be purpose-built to host sensor and/or actuator resources, such as a weather sensor devices that include multiple sensors related to weather monitoring (e.g., temperature, wind, humidity sensors, etc.), traffic sensors and controllers, among many other examples. Some devices may be statically located, such as a device mounted within a building, on a lamppost, sign, water tower, secured to a floor (e.g., indoor or outdoor), or other fixed or static structure. Other devices may be mobile, such as a sensor provisioned in the interior or exterior of a vehicle, in-package sensors (e.g., for tracking cargo), wearable devices worn by active human or animal users, an aerial, ground-based, or underwater drone among other examples. Indeed, it may be desired that some sensors move within an environment and applications can be built around use cases involving a moving subject or changing environment using such devices, including use cases involving both moving and static devices, among other examples.

Continuing with the example of FIG. 1A, software-based IoT management platforms (e.g., 140) can be provided to allow developers and end users to build and configure IoT applications and systems. An IoT application can provide software support to organize and manage the operation of a set of IoT devices for a particular purpose or use case. In some cases, devices may form a network or group through direct communication with other devices in the network. In some cases, one or more gateway devices (e.g., 125) may be provided through which different devices in the network may communicate to communicate with external resources, such as a wide area network (e.g., 120), remote servers, cloud computing resources, and other systems. In an example, gateways (e.g., 125) may perform the role of group authority devices or registrar devices for a secure domain within a machine-to-machine network, among other functions and features. Remote systems (e.g., 145) may serve as data aggregators for a machine-to-machine network, collecting data from data from any number of sensors (e.g., 110a-c) from any number of devices (e.g., 105a-c), and perform backend processing on such data. Backend systems, data aggregators, and other systems (within or without a corresponding machine-to-machine network) may also perform the role of group authority device or registrar device for a domain, among other examples.

In some cases, an IoT application can be embodied as an application on an operating system of a user computing device (e.g., 130) or a mobile app for execution on a smart phone, tablet, smart watch, or other mobile device (e.g., 132, 135). In some cases, the application can have an application-specific management utility allowing users to configure settings and policies to govern how the set devices (e.g., 105a-d) are to operate within the context of the application. A management utility can also be used to select which devices are used with the application. For instance, groups of devices can be designated and authorized to participate as devices within a particular application or function. The management utility can secure communications between authorized or grouped devices. In some cases, end-user devices used to define the grouping, or secure domain, can be designated as group authorities for the group. In some cases, at least a portion of the management utility can be provided on a group authority device. In other cases, a dedicated IoT management application (e.g., on a user device or application server) can be provided which can manage potentially multiple different IoT applications or systems. Indeed, the IoT management application, or system, may be hosted on a single system, such as a single server system (e.g., 140) or a single end-user device (e.g., 130, 132, 135). Alternatively, an IoT management system can be distributed across multiple hosting devices (e.g., 130, 132, 135, 140, 145, etc.).

In some cases, applications can be programmed, or otherwise built or configured, utilizing interfaces of an IoT management system. In some cases, the interfaces can adopt asset abstraction to simplify the IoT application building process. For instance, users can simply select classes, or taxonomies, of devices and logically assemble a collection of select devices classes to build at least a portion of an IoT application (e.g., without having to provide details regarding configuration, device identification, data transfer, etc.). Further, IoT application systems built using the IoT management system can be sharable, in that a user can send data identifying the built system to another user, allowing the other user to simply port the abstracted system definition to the other user's environment (even when the combination of device models is different from that of the original user's system). Additionally, system or application settings, defined by a given user, can be configured to be sharable with other users or portable between different environments, among other example features.

In some cases, IoT systems can interface (through a corresponding IoT management system or application or one or more of the participating IoT devices) with remote services, such as data storage, information services (e.g., media services, weather services), geolocation services, and computational services (e.g., data analytics, search, diagnostics, etc.) hosted in cloud-based and other remote systems (e.g., 145). For instance, the IoT system can connect to a remote service over one or more networks 120. In some cases, the remote service can, itself, be considered an asset of an IoT application. Data received by a remotely-hosted service can be consumed by the governing IoT application and/or one or more of the component IoT devices to cause one or more results or actions to be performed, among other examples.

One or more networks (e.g., 120) can facilitate communication between sensor devices (e.g., 105a-d), end user devices (e.g., 130, 132, 135), and other systems (e.g., 140, 145) utilized to implement and manage IoT applications in an environment. Such networks can include wired and/or wireless local networks, public networks, wide area networks, broadband cellular networks, the Internet, and the like.

In general, "servers," "clients," "computing devices," "network elements," "hosts," "system-type system entities," "user devices," "sensor devices," and "systems" (e.g., 105a-d, 125, 130, 132, 135, 140, 145, etc.) in example computing environment 100, can include electronic computing devices operable to receive, transmit, process, store, or manage data and information associated with the computing environment 100. As used in this document, the term "computer," "processor," "processor device," or "processing device" is intended to encompass any suitable processing apparatus. An "endpoint" or "asset" can refer to a single physical device (hosting one or more sensors or actuators), as well as (or alternatively) to each individual sensor or actuator provided on the device. In some instances, elements shown as single devices within the computing environment 100 may be implemented using a plurality of computing devices and processors, such as server pools including multiple server computers, processors, devices, sensors, actuators, etc. Further, any, all, or some of the computing devices may be adapted to execute any operating system, including Linux, UNIX, Microsoft Windows, Apple OS, Apple iOS, Google Android, Windows Server, etc., as well as virtual machines adapted to virtualize execution of a particular operating system, including customized and proprietary operating systems.

While FIG. 1A is described as containing or being associated with a plurality of elements, not all elements illustrated within computing environment 100 of FIG. 1A may be utilized in each alternative implementation of the present disclosure. Additionally, one or more of the elements described in connection with the examples of FIG. 1A may be located external to computing environment 100, while in other instances, certain elements may be included within or as a portion of one or more of the other described elements, as well as other elements not described in the illustrated implementation. Further, certain elements illustrated in FIG. 1A may be combined with other components, as well as used for alternative or additional purposes in addition to those purposes described herein.

As noted above, a collection of devices, or endpoints, may participate in Internet-of-things (IoT) networking, which may utilize wireless local area networks (WLAN), such as those standardized under IEEE 802.11 family of standards, home-area networks such as those standardized under the Zigbee Alliance, personal-area networks such as those standardized by the Bluetooth Special Interest Group, cellular data networks, such as those standardized by the Third-Generation Partnership Project (3GPP), and other types of networks, having wireless, or wired, connectivity. For example, an endpoint device may also achieve connectivity to a secure domain through a bus interface, such as a universal serial bus (USB)-type connection, a High-Definition Multimedia Interface (HDMI), or the like.

Figure 1B:
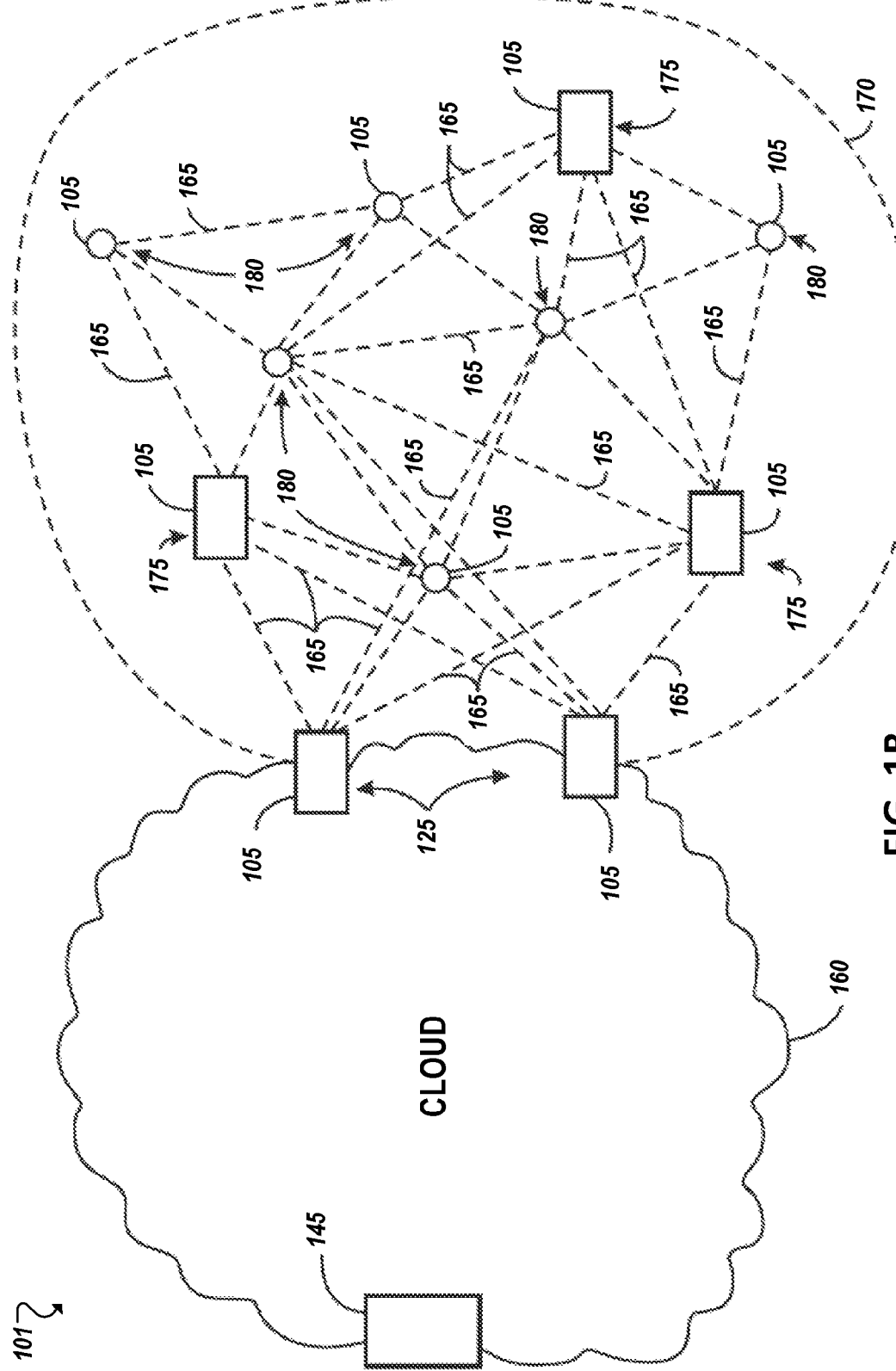
FIG. 1B illustrates an embodiment of a cloud computing network.

As shown in the simplified block diagram 101 of FIG. 1B, in some instances, a cloud computing network, or cloud, in communication with a mesh network of IoT devices (e.g., 105a-d), which may be termed a "fog," may be operating at the edge of the cloud. To simplify the diagram, not every IoT device 105 is labeled.

The fog 170 may be considered to be a massively interconnected network wherein a number of IoT devices 105 are in communications with each other, for example, by radio links 165. This may be performed using the open interconnect consortium (OIC) standard specification 1.0 released by the Open Connectivity Foundation™ (OCF) on Dec. 23, 2015. This standard allows devices to discover each other and establish communications for interconnects. Other interconnection protocols may also be used, including, for example, the optimized link state routing (OLSR) Protocol, or the better approach to mobile ad-hoc networking (B.A.T.M.A.N.), among others.

Three types of IoT devices 105 are shown in this example, gateways 125, data aggregators 175, and sensors 180, although any combinations of IoT devices 105 and functionality may be used. The gateways 125 may be edge devices that provide communications between the cloud 160 and the fog 170, and may also function as charging and locating devices for the sensors 180. The data aggregators 175 may provide charging for sensors 180 and may also locate the sensors 180. The locations, charging alerts, battery alerts, and other data, or both may be passed along to the cloud 160 through the gateways 125. As described herein, the sensors 180 may provide power, location services, or both to other devices or items.

Communications from any IoT device 105 may be passed along the most convenient path between any of the IoT devices 105 to reach the gateways 125. In these networks, the number of interconnections provide substantial redundancy, allowing communications to be maintained, even with the loss of a number of IoT devices 105.

The fog 170 of these IoT devices 105 devices may be presented to devices in the cloud 160, such as a server 145, as a single device located at the edge of the cloud 160, e.g., a fog 170 device. In this example, the alerts coming from the fog 170 device may be sent without being identified as coming from a specific IoT device 105 within the fog 170. For example, an alert may indicate that a sensor 180 needs to be returned for charging and the location of the sensor 180, without identifying any specific data aggregator 175 that sent the alert.

In some examples, the IoT devices 105 may be configured using an imperative programming style, e.g., with each IoT device 105 having a specific function. However, the IoT devices 105 forming the fog 170 device may be configured in a declarative programming style, allowing the IoT devices 105 to reconfigure their operations and determine needed resources in response to conditions, queries, and device failures. For example, a query from a user located at a server 145 about the location of a sensor 180 may result in the fog 170 device selecting the IoT devices 105, such as particular data aggregators 175, needed to answer the query. If the sensors 180 are providing power to a device, sensors associated with the sensor 180, such as power demand, temperature, and the like, may be used in concert with sensors on the device, or other devices, to answer a query. In this example, IoT devices 105 in the fog 170 may select the sensors on particular sensor 180 based on the query, such as adding data from power sensors or temperature sensors. Further, if some of the IoT devices 105 are not operational, for example, if a data aggregator 175 has failed, other IoT devices 105 in the fog 170 device may provide substitute, allowing locations to be determined.

Further, the fog 170 may divide itself into smaller units based on the relative physical locations of the sensors 180 and data aggregators 175. In this example, the communications for a sensor 180 that has been instantiated in one portion of the fog 170 may be passed along to IoT devices 105 along the path of movement of the sensor 180. Further, if the sensor 180 is moved from one location to another location that is in a different region of the fog 170, different data aggregators 175 may be identified as charging stations for the sensor 180.

As an example, if a sensor 180 is used to power a portable device in a chemical plant, such as a personal hydrocarbon detector, the device will be moved from an initial location, such as a stockroom or control room, to locations in the chemical plant, which may be a few hundred feet to several thousands of feet from the initial location. If the entire facility is included in a single fog 170 charging structure, as the device moves, data may be exchanged between data aggregators 175 that includes the alert and location functions for the sensor 180, e.g., the instantiation information for the sensor 180. Thus, if a battery alert for the sensor 180 indicates that it needs to be charged, the fog 170 may indicate a closest data aggregator 175 that has a fully charged sensor 180 ready for exchange with the sensor 180 in the portable device.

With the growth of IoT devices and system, there are increasing numbers of smart and connected devices available in the market, such as devices capable of being utilized in home automation, factory automation, smart agriculture, and other IoT applications and systems. For instance, in home automation systems, automation of a home is typically increased as more IoT devices are added for use in sensing and controlling additional aspects of the home. However, as the number and variety of devices increase, the management of "things" (or devices for inclusion in IoT systems) becomes outstandingly complex and challenging.

Some device management applications may be configured with preset settings designed to allow users to set up their systems quickly and with minimal work configuring the device. However, those settings may not be universally desirable, potentially limiting their flexibility and overall utility. In cases, where settings are configurable, a user may nonetheless struggle to make sense of the ideal combination of setting values, resorting to trial and error to figure out the optimal settings for their system (e.g., smart home, office, car, etc.). Indeed, the combination of settings that is ideal or optimal to one user may be subjective, however, other users may still be interested in the setting values determined by others which yielded these other users desirable results. For instance, a guest of a first user may observe, first hand, the configuration of the first user's system and desire to recreate the attributes of the observed system in their own system. However, in traditional systems, system settings are typically not portable due given that they are usually tied to identities of devices.

In some instances, incorporating a given device in a particular machine-to-machine network (e.g., in connection with an IoT application), may involve configuration by the user, such that the devices in the network, or a sub-domain of the network, are secured by encryption, authentication, or other mechanisms. A device designated as the group authority (and tasked with managing and approving the addition or subtraction of devices to such a secure domain) may not always be available, complicating reconfigurations of the domain, which may seek to add or subtract or re-enroll a device within the domain's group. For instance, without the presence of the group authority, new devices may not be authorized or authenticated for inclusion in the domain, even if doing so would be otherwise programmatically feasible.

In some implementations, a system can be provided with improved IoT management functionality to address at least some of the example issues introduced above. Generally, an improved IoT management system can simplify deployment of IoT devices through asset abstraction to significantly reduce the human touch points during deployment and redeployment. For instance, IoT management and applications can adopt a paradigm where, instead of referencing and being programmed to interoperate with specific IoT devices, the system can refer to abstracted classes, or taxonomies, of IoT devices (or "endpoints" or "assets", used interchangeably herein). Asset abstraction can be leveraged to automatically configure a deployed IoT system with minimal human intervention. Indeed, in some instances, configuration of the system can progress without a user having to actually specify which device to use. Instead, a deployment policy can be used instead by the system to automatically select and configure at least a portion of the devices within the system. Further, asset discovery, asset abstraction, and asset binding can facilitate addressing the challenge of portability of IoT applications, which has traditionally limited the general scalability and resiliency of IoT applications.

In some implementations, with asset abstraction, assets are treated indifferently as long they fall into a same category in the taxonomy, e.g., occupancy sensing, image capture, computation, etc. An IoT application, consequently, can be made portable, reusable and sharable, as it can be written and stored in a way that specifies only requirements (e.g., references to abstracted device taxonomies providing the requirements) without specifying the precise identity (or catalogue of identities) of compatible devices meant to provide these requirements. Additionally, asset discovery and abstraction can allow failover events to be dealt with automatically, by identifying new or substitute devices with functional characteristics to stand in for other devices (e.g., in a group or IoT network) that have been detected as malfunctioning, disabled, or otherwise unavailable. Asset discovery allows all available resources to be searched to detect those meeting the (abstracted) requirements specified for a given application and further selected, in some instances, on the basis of customizable or policy-based criteria based on these abstractions.

While automated configuration and reconfiguration of a machine-to-machine network may be facilitated through automated asset discovery and abstraction, in cases where a device is to be added to a secure domain, it may be necessary for the device to be additionally enrolled in the domain by a group authority. However, the group authority may not always be available to communicate with and authenticate a device, which has been selected for inclusion in a corresponding group, domain, or portion of a machine-to-machine network. In some implementations, the group authority may be required to be connected to the network to enable secure enrollment of devices in a group. However, such a requirement may be inefficient and inconvenient. Transferring group authority rights to another device may also be undesirable in some cases, as granting full enrollment permission to another device (or party controlling the device) may be unacceptable in that the transfer of sensitive data (e.g., keys, certificates, and other authentication data) utilized by the group authority device for enrollment may itself be insecure and the sharing of such data between multiple devices can jeopardize the integrity and management of such data. Accordingly, in some implementations, only a portion of a group authority's enrollment responsibilities may be delegated to another device, such as to device designated as a registrar device for a corresponding group. For example, a registrar may be delegated responsibility for detecting, introducing, and acting as a proxy for communications with the group authority, even when the group authority is absent from the network. This can allow online reconfiguration of IoT and other machine-to-machine systems possible even in the absence of onsite group authority, among other example features and advantages.

Figure 2:
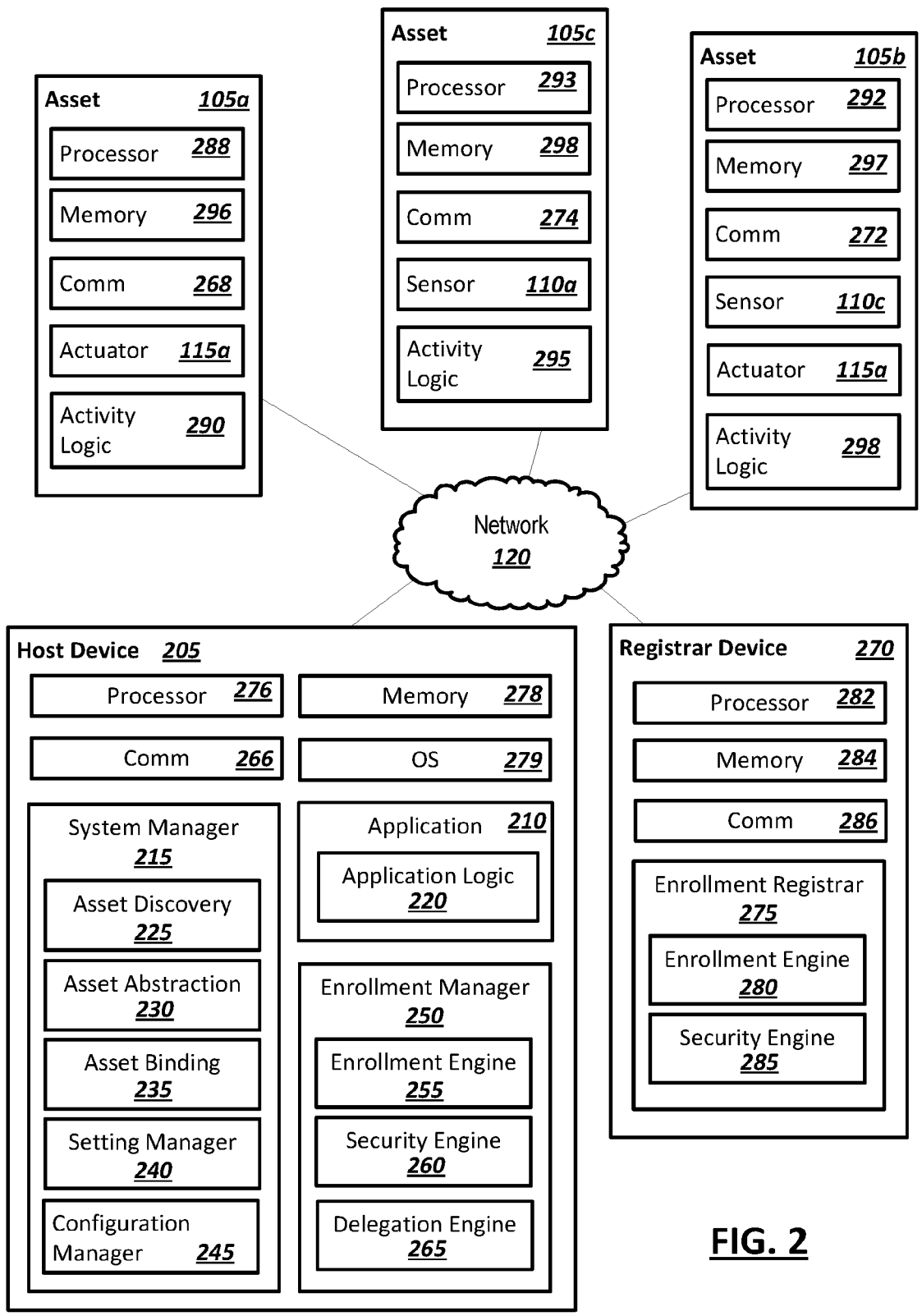
FIG. 2 illustrates an embodiment of a system including an example data management system.

Systems, such as those shown and illustrated herein, can include machine logic implemented in hardware and/or software to implement the solutions introduced herein and address at least some of the example issues above (among others). For instance, FIG. 2 shows a simplified block diagram 200 illustrating a system including multiple IoT devices, or assets (e.g., 105a-c) capable of being used in a variety of different IoT applications. In the example of FIG. 2, one or more host systems 205 are provided to host a particular IoT application 210. The same host system may host an IoT system manager 215 for use in identifying and deploying an IoT system for use with the application logic 220 of the application 210. In other implementations, a system manager 215 can be provided separate from the application 210 (e.g., on a remote server providing IoT system management as a service to the application 210 and its host).

In the particular example of FIG. 2, the system manager 215 can include a variety of logical modules (implemented in hardware and/or software) to provide IoT system management for one or more IoT applications and effectively deploy and manage a network of devices (or "assets") in an M2M or IoT network. For instance, an asset discovery module 225 may be provided that includes include functionality for determining which IoT devices are within range of each other, one or more gateways, or the device (e.g., 205) hosting the system manager 215. In some implementations, the system manager 215 can make use of the wireless communication (e.g., 266) capabilities of the host device 205 to attempt to communicate with devices within a particular radius. For instance, devices within range of a WiFi or Bluetooth signal emitted from the communications module(s) 266 of the host device 205 (or the communications module(s) (e.g., 268, 272, 274) of the assets (e.g., 105a-c)) can be detected. A gateway device in communication with the host device 205 may also report (e.g., to the asset discovery module 225) devices, which the gateway device has detected and is capable of communicating with, among other examples. Indeed, additional attributes can be considered by the asset discovery module 225 when determining whether a device is suitable for inclusion in a listing of devices for a given system or application. In some implementations, conditions can be defined for determining whether a device should be included in the listing. For instance, the asset discovery module 220 may attempt to identify, not only that it is capable of contacting a particular asset, but may also determine assets such as physical location, semantic location, temporal correlation, movement of the device (e.g., is it moving in the same direction and/or rate as the discovery module's host), permissions or access level requirements of the device, among other characteristics. As an example, in order to deploy smart lighting control for every room in a home- or office-like environment, an application may be deployed in a "per room basis." Accordingly, the asset discovery module 225 can determine a listing of devices that are identified (e.g., through a geofence or semantic location data reported by the device) as within a particular room (despite the asset discovery module 225 being able to communicate with and detect other devices falling outside the desired semantic location). Conditions for discovery can be defined in the IoT application (e.g., 210) itself or may be configurable such that a user can customdefine at least some of the conditions. Additionally, in some examples, different discovery conditions can be defined for different asset types (or taxonomies), as appropriate. For instance, a remote service may be a perfectly acceptable asset to utilize for one asset taxonomy used in an application, where the proximity of the service's host can be ignored, while proximity may be (e.g., in the very same system) an important factor for other types of assets, such as a sensor, actuator, etc.

A system manager 215 can also include an asset abstraction module 230. An asset abstraction module 230 can recognize defined mappings between specific IoT devices or, more generally, specific functionality that may be included in any one of a variety of present or future IoT devices with a collection of defined taxonomies, or asset abstractions for the devices. The asset abstraction module 230 can determine, for each asset discovered by an asset discovery module 225 (e.g., according to one or more conditions), a respective asset abstraction, or taxonomy, to which the asset "belongs". Each taxonomy can correspond to a functional capability of an asset. Assets known or determined to possess the capability can be grouped within the corresponding taxonomy. Some multi-function assets may be determined to belong to multiple of the taxonomies. The asset abstraction module 230 can, in some cases, determine the abstraction(s) to be applied to a given asset based on information received from the asset (e.g., during discovery by asset discovery module 225). In some cases, the asset abstraction module can obtain identifiers from each asset and query a backend database for pre-determined abstraction assignments corresponding to that make and model of asset, among other examples. Further, in some implementations, the asset abstraction module 230 can query each asset (e.g., according to a defined protocol) to determine a listing of the capabilities of the asset, from which the asset abstraction module 230 can map the asset to one or more defined abstraction taxonomies. Asset abstraction module 230 allows the application to treat every asset falling within a given taxonomy as simply an instance of that taxonomy, rather than forcing the system manager 215 to be configured specifically to a precise device model. Asset abstraction module 230 can access a taxonomy framework (defined on an application-, system-, or universal-basis) that abstracts away the precise device into taxonomies including higher- and lower-level taxonomies for sensing, actuating, computation, storage, and other taxonomies. With asset abstraction, assets are treated indifferently as long they fall into a same category in the taxonomy, e.g., occupancy sensing. An IoT application (e.g., 210) and its settings, through asset abstraction, can be made portable, reusable and sharable, as the application 210 can be written and stored in a way that specifies only asset requirements (i.e., taxonomies) without their specific identity information.

A system manager 215 can also include an asset binding module 235 which can select, from the discovered assets, which assets to deploy for a system. In some cases, upon selecting an asset, the asset binding module 235 can cause the corresponding asset to be configured for use with the application 210. This can involve provisioning the asset with corresponding code (e.g., to allow it to communicate and interoperate with the application 210 and/or other assets), logging in, unlocking, or otherwise enabling the asset, sending session data to or requesting a session with the asset, among other examples. In cases where multiple assets of the same taxonomy have been identified (and exceed a maximum desired number of instances of the taxonomy), the asset binding module 235 can additionally assess which of the assets is the best fit with the application 210. For instance, the application 205 can define criteria indicating desirable attributes of assets utilized in the application 210. These criteria can be global criteria, applying to instances of every taxonomy, or can be taxonomy-specific (i.e., only applying to decisions between assets within the same taxonomy). Asset binding can provision the assets specified by the IoT application (e.g., 210) for deployment automatically (before or during runtime). Portions of the application (e.g., 210) can be distributed on one or more of the assets in some implementations. Once assets are provisioned, the deployed assets can be used collectively for achieving the goals and functionality designed for the application (e.g., 210). Further, in cases where new or substitute devices (e.g., in a modified or entirely new network) are detected (e.g., using asset discovery module 225), asset binding module 235 can bind new devices dynamically to criteria set for the IoT application (e.g., 210) based on asset abstractions defined for the IoT application.

A system manager 215 can additionally provide functionality (e.g., through setting manager 240) to allow users define settings to be applied to the selected asset taxonomies (or requirements) of the application 210 and the application 210 generally. A variety of different settings can be provided depending on the collection of assets to be used by the application and the overall objectives of the application. Default setting values can be defined and further tools can be provided to allow users to define their own values for the settings (e.g., a preferred temperature setting of an air conditioned, the number of second to lock a smart lock or locker, sensitivity setting utilized for triggering a motion sensor and control, etc.). What settings constitute the "ideal" may be subjective and involve some tinkering by the user. When the user is satisfied with the settings, the user may save the settings as a configuration. In some implementations, these configurations can be stored locally (e.g., at host device 205) or on the cloud. In some cases, configurations can be shared, such that a user can share the settings they found ideal with other users (e.g., friends or social network contacts, etc.). Configuration data can be generated from which the settings are automatically readopted at runtime by the system manager 215, each time the application is to deploy the assets it discovers. Consequently, while specific devices are loosely tied to the user's instance of the application (as they are abstracted away), settings can be strongly tied to the user, such that the user may migrate between environments, including environments with different sets of assets that are bound to the application at runtime. Regardless of the specific device identifiers or implementations selected to satisfy the abstracted asset requirements of the application, the same settings can be applied (e.g., as the settings, too, are directed to the abstractions of the assets (i.e., rather than specific assets)). To the extent a particular setting does not apply to a selected instance of a taxonomy, the setting can be ignored. If a selected instance of a taxonomy possesses settings that are undefined by the user in the configuration (e.g., because they are unique to the particular asset), default values for these settings can be automatically set or the user can be alerted that these settings are undefined, among other examples.

A setting manager 240 can be used in runtime to cause the settings to be applied at the IoT devices (assets) selected for deployment with the application 210. The system manager 215 may include logic enabling the system manager 215 (and its composite modules) to communicate using a variety of different protocols with a variety of different devices. Indeed, the system manager 215 can even be used to translate between protocols to facilitate to asset-to-asset communications. Further, the setting manager 240 can send instructions to each of the selected assets for deployment to prompt each asset to adjust settings in accordance with those defined for the asset taxonomy in the setting configuration defined by the user. Other settings can address settings of the application or system manager, and applying such settings can be accomplished in an automated and straightforward manner at the device(s) (e.g., 130) hosting the application 210 and system manager 215, among other examples.

A configuration manager 245 can additionally be provided with a system manager 215 to assist in detecting opportunities to add or substitute devices to a M2M network of devices for use by an application 210. For instance, a configuration manager can identify the detection of a new or existing asset and device(s) within a network and determine that the device can be added as an additional, redundant, or substitute device for use by the application 210. The configuration manager 245 can also identify faults and errors with devices provisioned in an IoT system and perform failover tasks to identify potential substitute devices (detected by asset discovery module 225) and initiating the replacement of the failed device with the substitute device, among other instances. A configuration manager 245 can additionally drive the deployment of these new devices and do so dynamically so as not to disrupt other devices in the IoT system used by the application 210. Further, a configuration manager 245 can detect whether the new or substitute device is to be included in any secured group or domain within the current IoT system and may invoke an enrollment manager 250 (e.g., of a group authority system) to enroll the new device in the secure domain, among other example features and functionality.

In some cases, a system (e.g., 205) hosting an IoT application (e.g., 210) and/or corresponding IoT system manager (e.g., 215) may also embody a group authority managing one or more groups, or secure domains, defined within the M2M IoT system used by the IoT application. Accordingly, the host system 205 may additionally include an enrollment manager 250 to manage enrollment of devices within one or more IoT groups. In other implementations, the enrollment manager (and group authority) may be implemented remote from the host of the IoT application (e.g., 210) and/or corresponding IoT system manager (e.g., 215. For instance, the enrollment manager 250 may provided together with the IoT system manager 215 on a common system (e.g., a system of an IT administrator) remote from a system hosting the IoT application 210, among a variety of other potential alternative embodiments.

Regardless of where the enrollment management 250 is hosted, an enrollment manager 250 may possess functionality including an enrollment engine 255, security engine 260, and delegation engine 265, among potentially other or additional logical modules (implemented in hardware and/or software). An enrollment engine 255 may possess functionality for identifying and managing one or more groups, or secure domains, and track the composite devices within each group, the authentication and security policies utilized by each group, the IoT applications to which the group applies, among other information for defining and maintaining groups defined within one or more IoT networks. A security engine 260 may operate in tandem with the enrollment engine 250 and provide functionality for storing, managing, and using authentication data (e.g., encryption keys, certificates, and other crypto data) to establish trusted relationships between the enrollment manager 250 (and its host system) and one or more assets (e.g., 105*a*-*c*) to be included in a particular group, or secure domain, managed by the enrollment manager 250. Delegation engine 265 can be utilized to initiate and manage trusted relationships (supported by security engine 260) with one or more registrar systems (e.g., 270) to which enrollment tasks of the enrollment manager 250 may be delegated (in a secure and trusted manner) for one or more groups managed by the enrollment manager.

A device (e.g., 205) hosting all or a portion of an IoT application 210, IoT system manager 215, and/or enrollment manager 250 can include one or more processors (e.g., 276), one or more memory elements (e.g., 278), an operating system (e.g., 279), among other components through which the logic of IoT application 210, IoT system manager 215, and/or enrollment manager 250 can be implemented. In some implementations, the IoT application 210 may be one of several applications hosted at least in part on the device (e.g., 205). In some implementations, the IoT system manager 215 may be an application separate from application 205.

Further, a device (e.g., 270) designated as a registrar device may likewise include one or more processors (e.g., 282), one or more memory elements (e.g., 284), a communications module (e.g., 286), operating system, and other components to serve as a designated registrar device for one or more groups within one or more M2M IoT networks. In some instances, a registrar device 270 may be selected based on a presumption that the registrar device 270 is likely to remain within a particular IoT network, or based on particular features of the device 270, such as its ability to communicate with certain asset types, static or fixed location of the device, among other factors. In one implementation, a device serving as a gateway within an IoT system may be designated as a registrar device 270. A registrar device 270 may be provisioned with enrollment registrar logic 275 to perform as a registrar for a particular enrollment manager (and group authority). In some instances, enrollment registrar logic 275 may be loaded onto a device (e.g., 270) in response to being designated (e.g., by the corresponding enrollment manager (e.g., 250)) as a registrar device. Indeed, in some cases, enrollment manager 250 (e.g., using delegation engine 265) may provide enrollment registrar logic 275 and other registrar data to the registrar device 270 (over a secure network channel) in order to enable the device 270 to serve as a registrar device. In one example, enrollment registrar logic 275 can include an enrollment engine 280 to perform delegated enrollment tasks and communicate with the enrollment manager 250 to coordinate the performance of these tasks, as well as a security engine 285 to manage authentication data and perform cryptographic processing utilized to establish and maintain trusted relationships with its corresponding group authorities and IoT devices, which the enrollment engine 280 assists in enrolling in corresponding groups, among other example functionality.

Asset abstraction can assist not only in easing the deployment of a system, but also in the programming of IoT applications. For instance, development systems may be provided that provide declarative programming tools allowing users, including novice programmers, to specify generalized or abstracted requirements of a IoT application, expressed as various defined asset taxonomies. The user may develop an IoT application, in part, by declaring relationships between two or more of the selected taxonomies to indicate input-output, sensor-actuator, or other relationships that are to be automatically defined in corresponding application code. Specific functions of application logic (e.g., 220) may also be mapped to particular taxonomies to define relationships between particular application functions and particular asset types, or taxonomies.

Continuing with the description of FIG. 2, each of the IoT devices (e.g., 105*a*-*c*) may include one or more processors (e.g., 288, 292, 293), one or more memory elements (e.g., 296, 297, 298), and one or more communications modules (e.g., 268, 272, 274) to facilitate their participation in an IoT network and application. Each device (e.g., 105*a*-*c*) can possess unique hardware and other logic (e.g., 290, 295, 298) to realize the intended function(s) of the device. For instance, devices may be provided with such resources as sensors of varying types (e.g., 110*a*, 110*c*), actuators (e.g., 115*a*) of varying types, energy modules (e.g., batteries, solar cells, etc.), computing resources (e.g., through a respective processor and/or software logic), security features, data storage, and other resources. Activity logic (e.g., 290, 295, 298) of the respective IoT devices may dictate how these sensors and actuators are engaged and function.

Figure 3A:
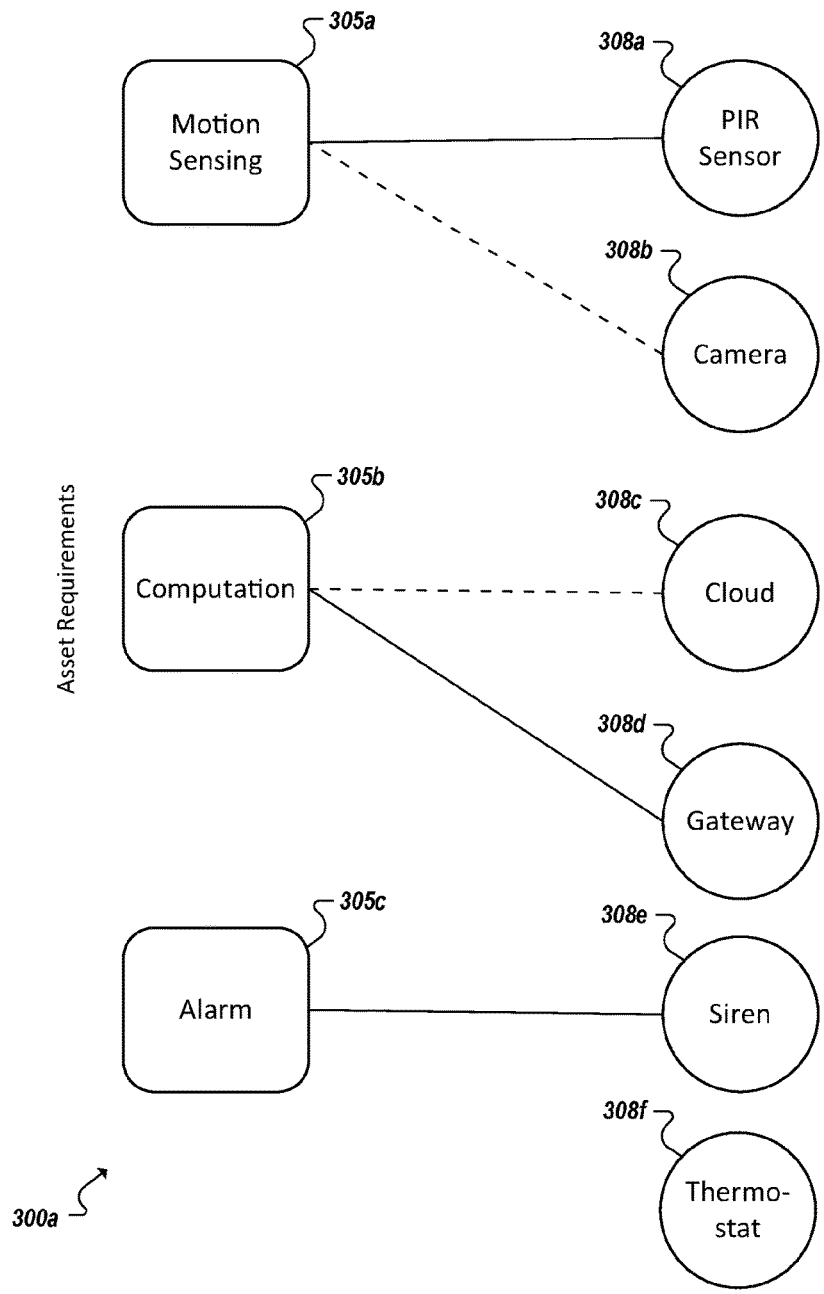
FIG. 3A is a simplified block diagram illustrating an example of asset abstraction and binding.

Turning to FIG. 3A, a simplified block diagram 300a is shown representing a simplified example of asset abstraction. A variety of different taxonomies can be defined at varying levels. For instance, a sensor taxonomy can be a parent to a multitude of specific sensor-type taxonomies (e.g., child taxonomies for light sensing, motion sensing, temperature sensing, liquid sensing, noise sensing, etc.), among other examples. In the example of FIG. 3A, an IoT application has been defined to include three asset requirements, represented by taxonomies Motion Sensing 305a, Computation 305b, and Alarm 305c. During asset discovery, a variety of assets (e.g., 308a-f) can be identified as usable by the application (e.g., based on the assets meeting one or more defined discovery conditions). One or more corresponding taxonomies, or abstractions, can be identified (e.g., by an IoT management system) for each of the assets 308a-f. Some of the abstractions may not have relevance to the asset requirements and function of the application, such as an abstraction (e.g., Temperature Sensor and/or HVAC Actuator) determined for thermostat device 308f. Other asset abstractions may match the abstractions (e.g., 305a-c) designated in the IoT application as asset requirements of the application. Indeed, more than one discovered asset may be fit one of the asset requirements. For instance, in the example of FIG. 3A, a PIR sensor 308a and camera 308b are each identified as instances of a motion sensing asset taxonomy 305a. Similarly, a cloud-based computing resource 308c and network gateway 308d are identified as instances of a computation asset taxonomy 305b. In other instances, there may be just a single discovered device satisfying an application asset requirement (e.g., siren 308e of the alarm taxonomy 305c), among other examples.

Conventionally, IoT and wireless sensor network (WSN) applications have been developed to intricately define dataflow among a determined set of physical devices, which involves device-level discovery in development time to obtain and hardcode the corresponding device identifiers and characteristics. By utilizing asset abstraction, development can be facilitated to allow the devices to be discovered and determined at runtime (e.g., at launch of the application), additionally allowing the application to be portable between systems and taxonomy instances. Further, development can be expedited by allowing developers to merely specify asset requirements (e.g., 305a-c), without the necessity to understand radio protocol, network topology, and other technical features.

In one example, taxonomies for asset abstraction can involve such parent taxonomies as sensing assets (e.g., light, presence, temperature sensors, etc.), actuation (e.g., light, HVAC, machine controllers, etc.), power (e.g., battery-powered, landline-powered, solar-powered, etc.), storage (e.g., SD, SSD, cloud storage, etc.), computation (e.g., microcontroller (MCU), central processing unit (CPU), graphical processing (GPU), cloud, etc.), and communication (e.g., Bluetooth, ZigBee, WiFi, Ethernet, etc.), among other potential examples. Discovering which devices possess which capabilities (and belong to which taxonomies) can be performed using varied approaches. For instance, some functions (e.g., sensing, actuating, communication) may be obtained directly from signals received from the device by the system management system via a common descriptive language (e.g., ZigBee's profiles, Bluetooth's profiles and Open Interconnect Consortium's specifications), while other features (e.g., power, storage, computation) may be obtained through deeper queries (utilizing resources on top of the operating system of the queried device), among other examples.

Asset binding can be applied to determine which discovered assets (fitting the asset requirements (abstractions) defined for an application) are to actually be deployed. Criteria can be defined at development time and/or before/at runtime by the application's user, which an IoT system manager (e.g., 215) can consult to perform the binding. For instance, as shown in FIG. 3A, according to the criteria set forth for the application (or for a particular session using the application), one of multiple matching assets for a required taxonomy can be selected. For instance, between PIR sensor 308a and camera 308b, corresponding criteria (e.g., criteria to be applied generally across all taxonomies of the application and/or taxonomies specific to the motion sensing taxonomy 305a) can result in PIR sensor 308a be selected to be deployed to satisfy the motion sensing asset requirement 305a of the application. Similarly, criteria can be assessed to determine that gateway 308d is the better candidate between it and cloud resource 308c to satisfy the application's computation requirement 305b. For asset requirements (e.g., 305c) where only a single discovered instance (e.g., 308e) of the asset taxonomy is discovered, asset binding is straight-forward. Those discovered devices (e.g., 308a, 308d, 308e) that have been selected, or bound, can then be automatically provisioned with resources from or configured by the IoT system manager (e.g., 215) to deploy the application. Unselected assets (e.g., 308b, 308c, 308f) may remain in the environment, but are unused in the application. In some instances, unselected assets can be identified as alternate asset selections (e.g., in the event of a failure of one of the selected assets), allowing for swift replacement of the asset (deployed with the same settings designated for instances of the corresponding taxonomy).

In some instances, asset binding can be modeled as a bipartite matching (or assignment) problem in which the bipartite graph can be expressed by G=(R,A,E) where R denotes the asset requirements, A denotes the available assets and e=(r,a) in E where a in A is capable of r in R. Note that if R requests for n instances of a particular assets, A' can be defined as:

$$\bigcup_n A$$

from which a solution for the (maximum) (weighted) matching problem can be computed. For instance, exhaustive search can be applied as the number of vertices in the bipartite graph are small and the edges are constrained in the sense that there is an edge (r,a) only if a is capable of r.

Figure 3B:
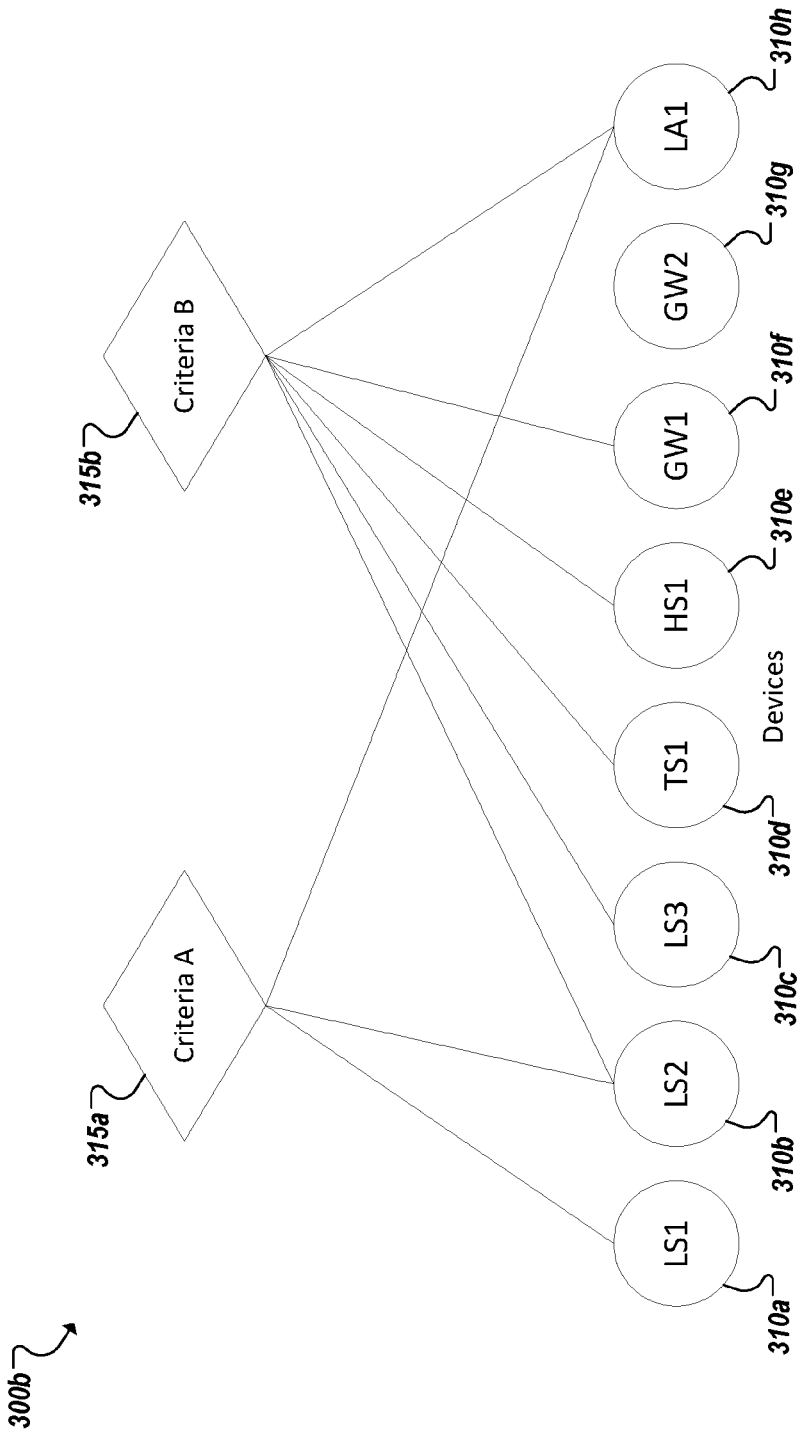
FIG. 3B is a simplified block diagram illustrating an example of asset discovery.

Turning to the simplified block diagram 300b of FIG. 3B, an example of asset discovery is represented. Asset discovery can allow the scope of available devices to be confined based on discovery conditions or criteria, such as conditions relating to device proximity, room, building, movement state, movement direction, security, permissions, among many other potential (and configurable) conditions. The benefits of such targeted discovery can trickle down to asset binding, as unchecked discovery may return many possible bindings, especially in large scale deployment. For example, in a smart factory, the action of "deploying predictive maintenance" may be ambiguous as there may be hundreds of sensors, motors, alarms, etc. in a factory facility. Asset discovery, in some implementations, takes as input a policy or user input from which a set of discovery criteria can be identified. Upon detecting the universe of assets with which the application could potentially operate, the criteria can be used to constrain the set, in some cases, providing a resulting ordered list of available assets, which can be expressed as f:C×D→D, where C denotes criteria, D denotes a set of devices, and the codomain is a totally ordered set.

For instance, in the example of FIG. 3B, two discovery criteria 315a, 315b are identified for an application. Additional criteria may be defined that is only to apply to some or a specific one of the categories, or taxonomies, of assets, among other examples. Based on the defined criteria 315a-b in this example, the output of discovery according to search criteria A 315a leads to the codomain of a subset of devices in the environment—LS1 (310a), LS2 (310b), GW2 (310g) and LA1 (310h), whereas search criteria B results in LS2 (310b), LS3 (310c), TS1 (310d), HS1 (310e), GW1 (310f), and LA1 (310h). Based on the set of defined discovery criteria (e.g., 315a-b), asset discovery can attempt to reduce the total collection of identified assets to a best solution. Additionally, determining the set of discovered assets for binding consideration can incorporate determining a minimum set of discovered devices, based on the asset requirements of the application. For instance, a minimum set can be selected during discovery such that at least one asset of each required taxonomy is present in the set, if possible. For instance, in the example of FIG. 3B, it can be identified (e.g., by an asset discovery module of the system manager) that application of only criteria B (315b) in discovery yields at least one asset for each of the taxonomies defined for the application.

Figure 3C:
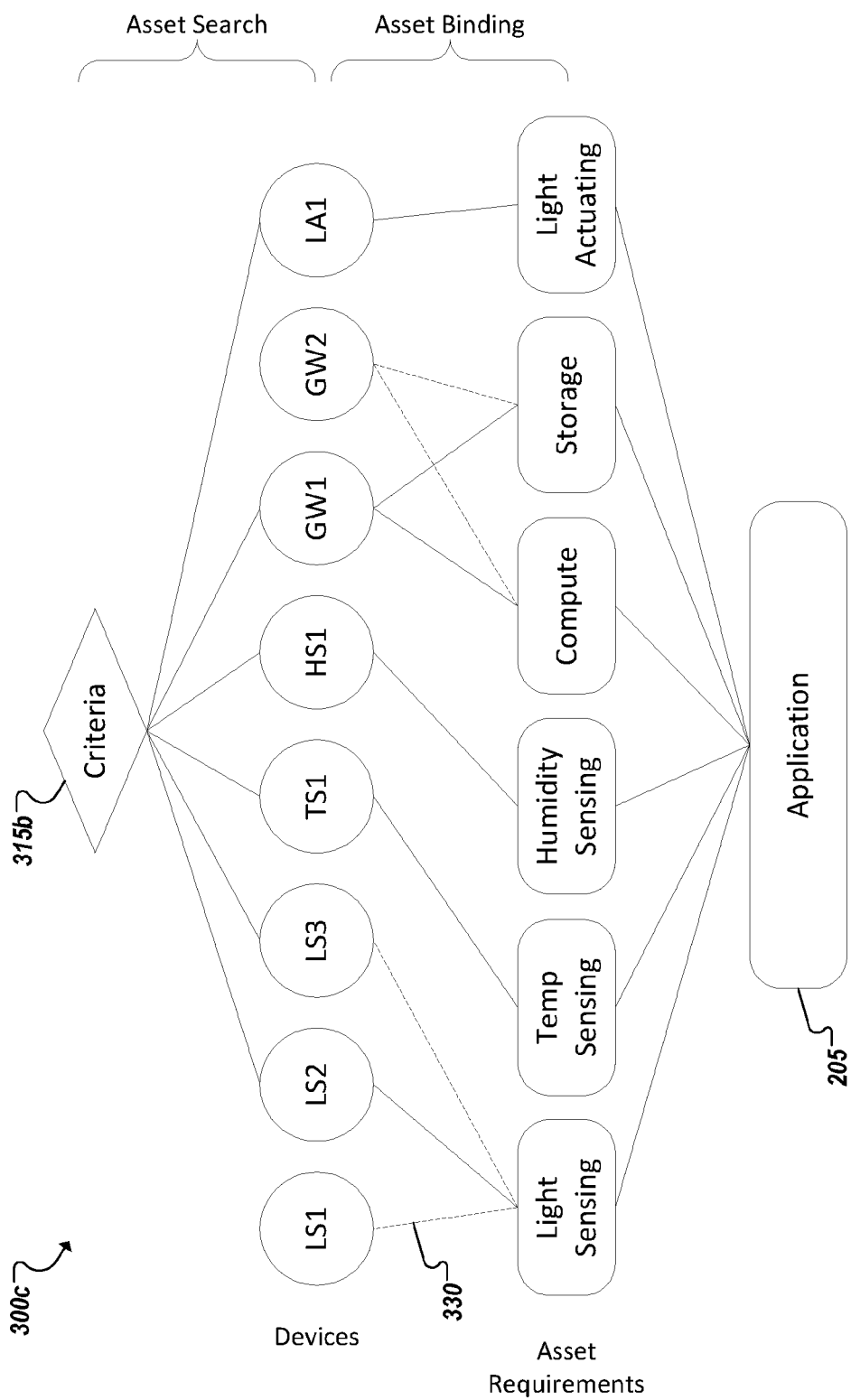
FIG. 3C is a simplified block diagram illustrating an example of asset abstraction and binding using a discovered set of assets.

For instance, the block diagram 300c FIG. 3C illustrates the end-to-end deployment determinations of a system manager. For instance, based on the discovery conducted in the example of FIG. 3B, a subset of the assets (e.g., LS2 (310b), LS3 (310c), TS1 (310d), HS1 (310e), GW1 (310f), and LA1 (310h)) are "discovered" for potential use by the application (e.g., based on their compliance with criteria B (and the underrepresentation of assets in compliance with criteria)). Accordingly, assets LS1 and GW2 are not bound to the application 205 (as indicated by the dashed lines (e.g., 330)), despite each asset being an instance of one of the asset requirements (e.g., Light Sensing, Compute, and Storage) of the application 205 and being discovered as accessible within the network.

As noted above, additional criteria can be defined and applied during asset binding. During binding, where the set of discovered assets include more than one instance of a particular required asset taxonomy (e.g., as with assets L2 and L3 in asset taxonomy Light Sensing), criteria can be applied to automatically select the asset that is the better fit for deployment within the IoT system governed, controlled, or otherwise supported by the application 205. Further, as illustrated in FIG. 3C, it is possible for a single asset instance (e.g., GW1) to both belong to two or more taxonomies and to be selected for binding to the application for two or more corresponding asset requirements (e.g., Compute and Storage), as shown. Indeed, a binding criterion can be defined to favor opportunities where multiple asset requirements of the application can be facilitated through a single asset, among other examples.

As represented generally in FIG. 3C, asset discovery can provide the first level for confining the scope of an asset-to-application asset requirement mapping. A user or developer can specify (in some cases, immediately prior to runtime) the asset requirements for a particular application, and an environment can be assessed to determine whether assets are available to satisfy these asset requirements. Further, the system manager utility can automatically deploy and provision discovered assets to implement that application, should the requisite combination of assets be found in the environment. Additionally, the system manager utility can automatically apply setting values across the deployed assets in accordance with a configuration defined by a user associated with the application. However, if no instances of one or more of the asset requirements (required taxonomies) are discovered, the application may be determined to be un-deployable within the environment. In such cases, a system manager utility can generate an alert for a user to identify the shortage of requested taxonomy instances, including identifying those taxonomies for which no asset instance was discovered within the environment, among other examples.

Figure 4A:
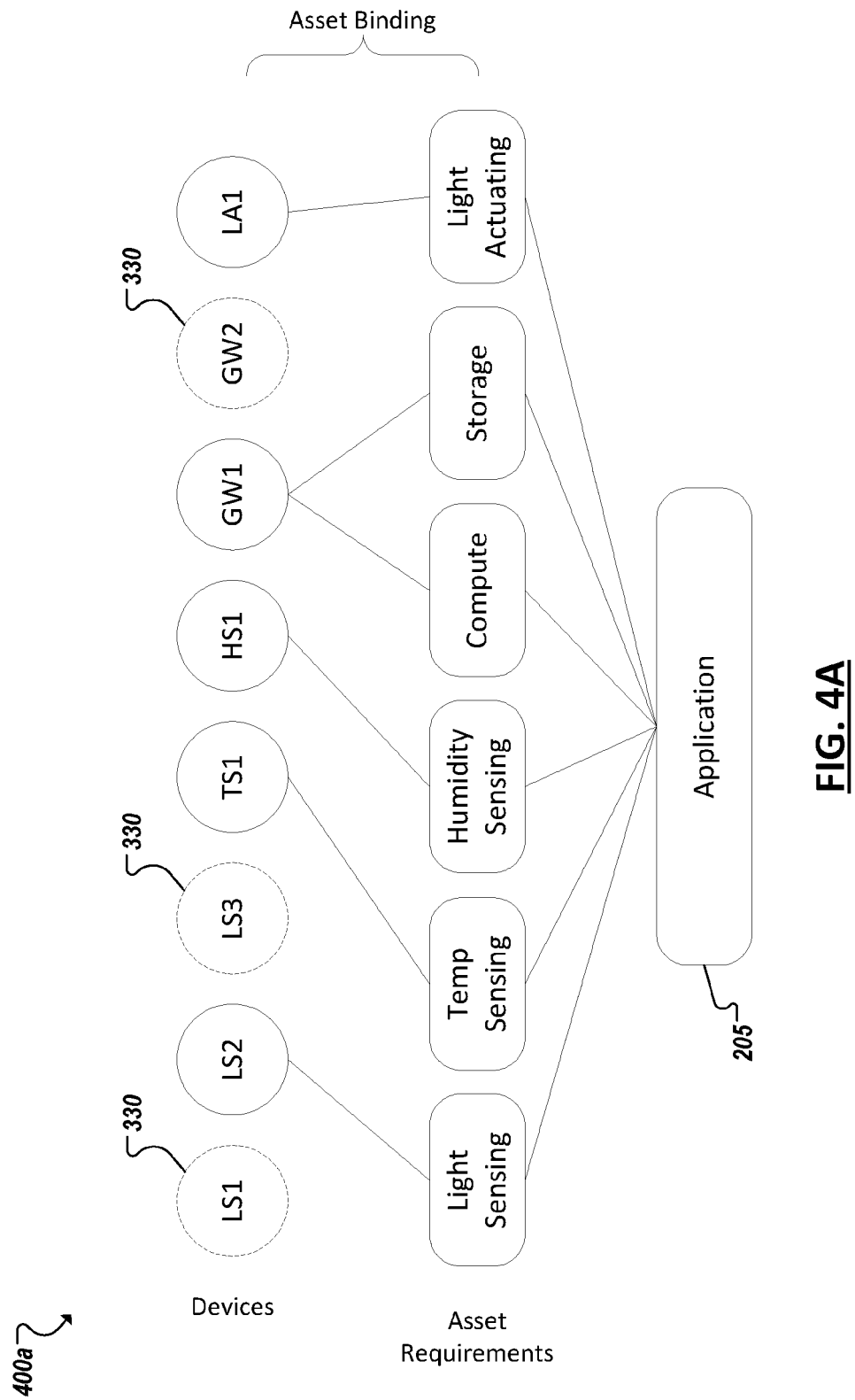
FIGS. 4A-4C are simplified block diagrams illustrating example reconfigurations of an example machine-to-machine network.
Figure 4B:
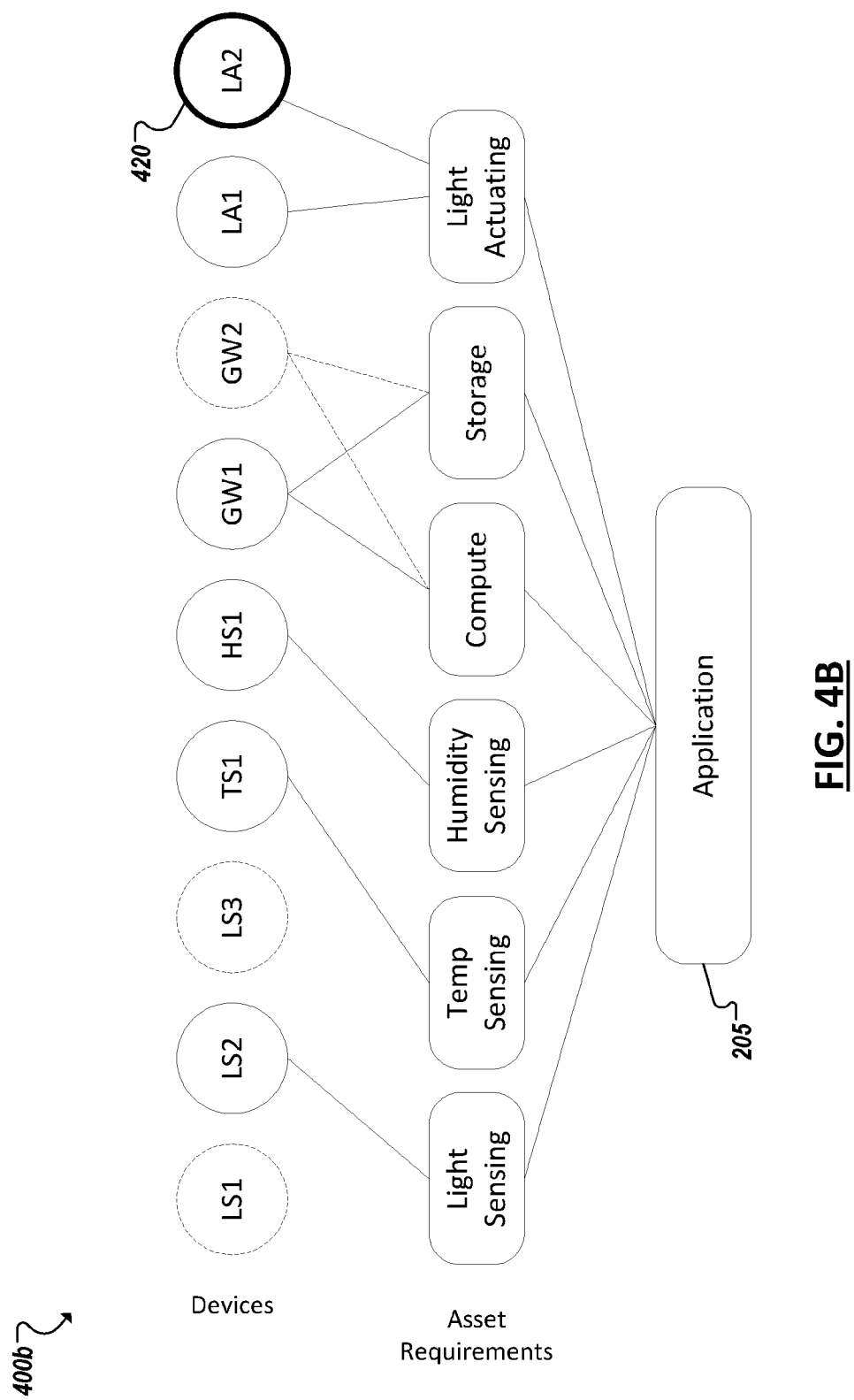

Turning to FIG. 4A, a representation of an IoT system or network is shown (e.g., building on the example of FIGS. 3A-3C), which has been deployed and configured for use with an IoT application 205. Other assets (e.g., 405, 410, 415) may be capable of also connecting to and participating in the IoT system, but have not been bound (or otherwise selected) for inclusion in the network. As noted above, an IoT system, through abstraction, may be able to be conveniently, and even dynamically, reconfigured, resulting in the addition (and binding) of new or substitute assets to the IoT system. For instance, in the example of FIG. 4B, a new asset 420 may be introduced to an IoT network, allowing an IoT system manager to discovery the asset and determine whether to bind the new asset 420 to one or more asset abstraction designated in connection with a particular application 205. Should the system manager determine that the asset should be added, the new asset 420 may be added as an additional (redundant or supplemental) asset corresponding to a particular asset abstraction (e.g., light actuating), replace an existing asset (e.g., previously bound to a common asset abstraction), or may be bound to an asset abstraction requirement of the application 205 that previously was unbound (i.e., no asset has been discovered which fulfilled the requirement), among other examples. In the particular example of FIG. 4B, the new asset 420 is added as an additional light actuator (to supplement light actuator LA1).

Figure 4C:
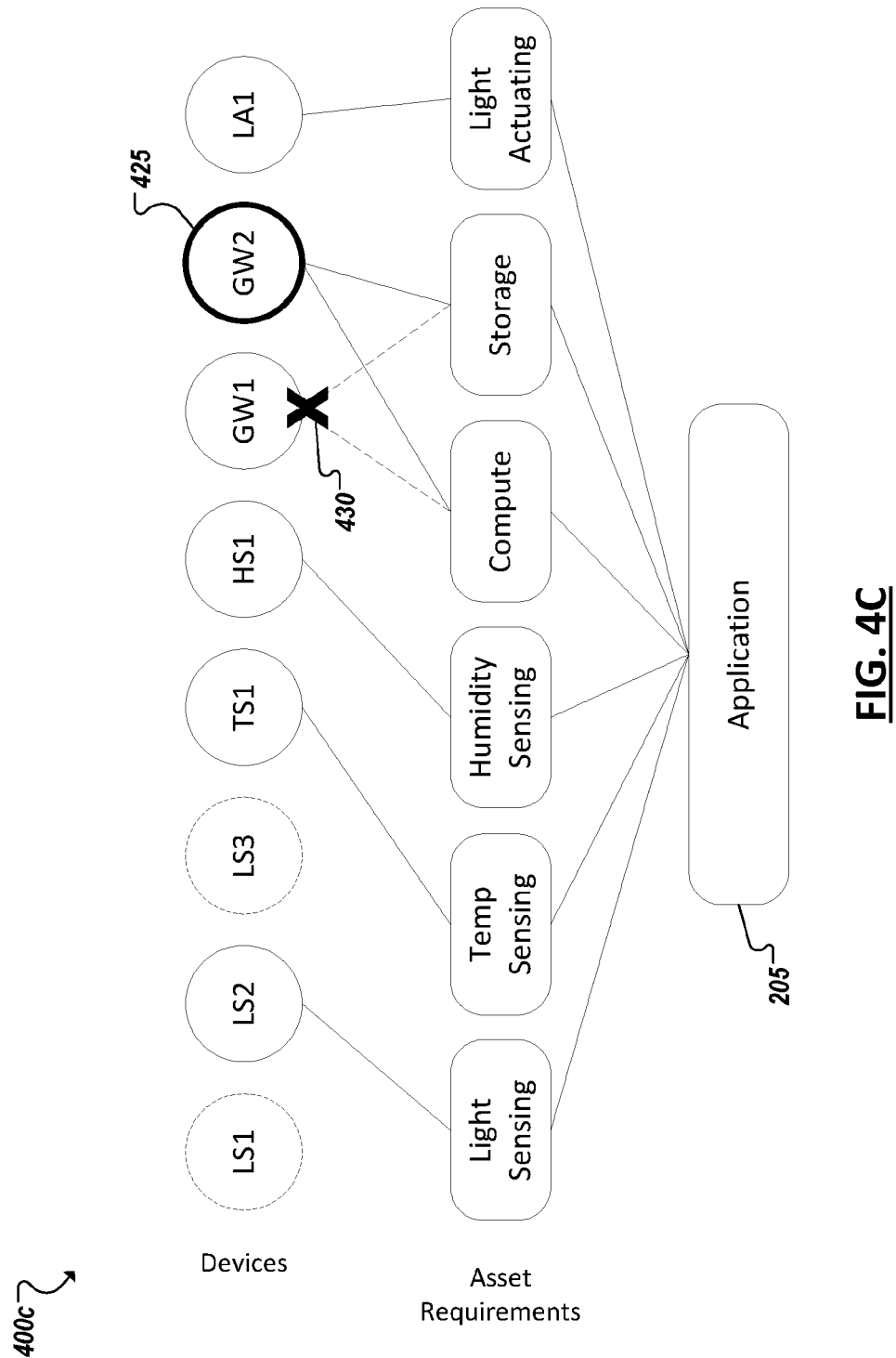

In other implementations, as shown in the example illustrated in FIG. 4C, a reconfiguration of an IoT system can involve the replacement of one asset with another (e.g., according to an abstraction and criteria set for the abstraction). For instance, replacement of one asset within another can take place in connection with a failover policy defined for a particular IoT system associated with an IoT application. For instance, an error (e.g., 425) may be detected involving a particular one of the assets 430 in the IoT system. According to a policy, detection of the error may result in an attempt to discover (or identify already discovered, but unbound) assets (e.g., 435) to replace the asset 430 where the error was detected. The previously unbound asset 435 may then be bound to one or more asset abstraction requirements previously bound to the defective asset 430. In cases where a newly added asset (e.g., 435) is also added to a particular group, or secure domain, of the IoT system, reconfiguration can also involve the enrollment of the new asset in the group (e.g., as an additional or replacement asset in the group).

Figure 5:
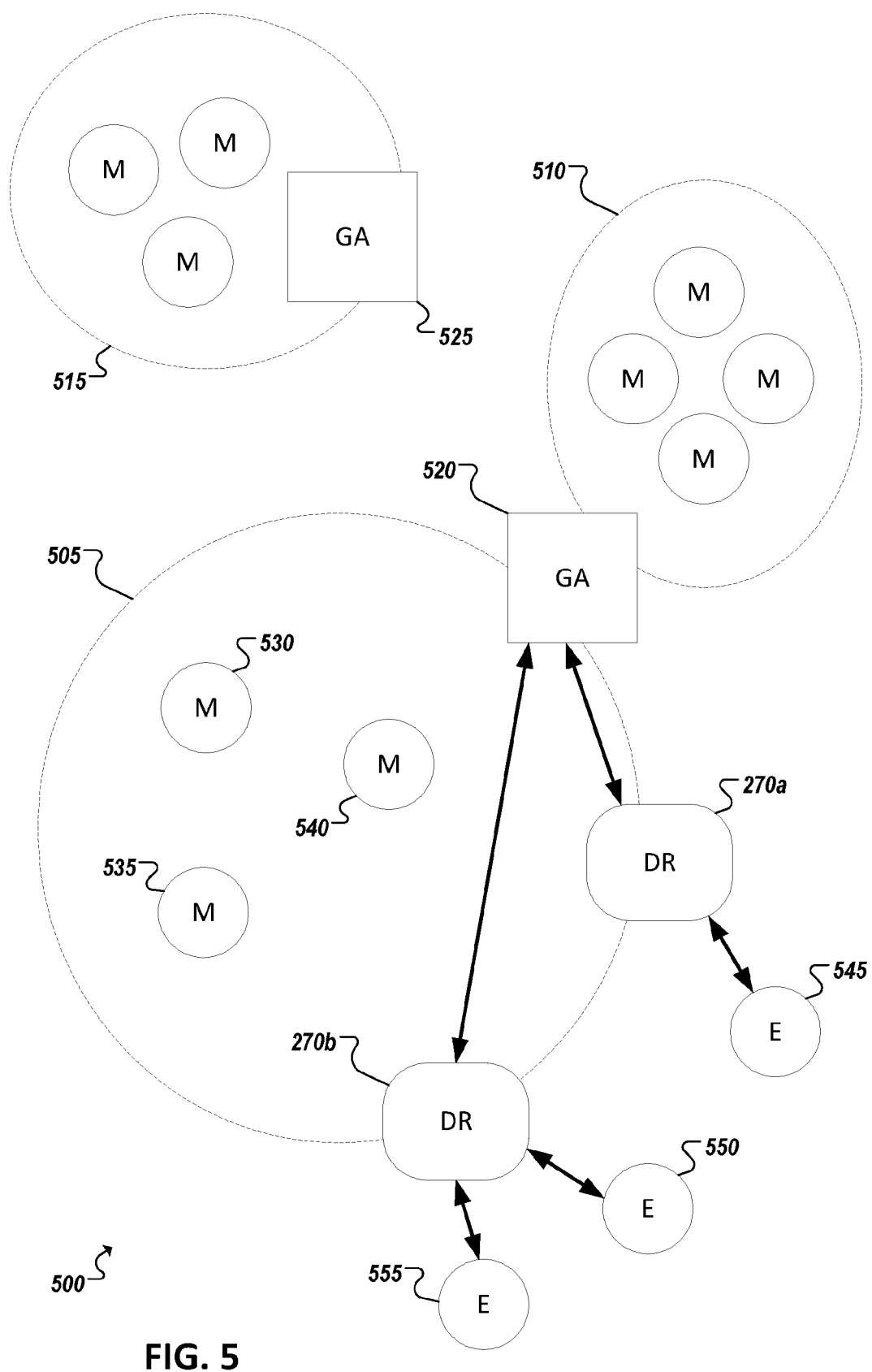
FIG. 5 is a simplified block diagram illustrating an example secure domain according to at least some embodiments.

Turning to FIG. 5, a simplified block diagram 500 is shown illustrating a representation of groups, or secure domains 505, 510, 515, defined within an IoT system. A secure domain in the present context may be an organized grouping of assets, or endpoints, in which group membership and connectivity is managed or controlled by an administrative entity (and device associated with the administrative entity). In general, device authentication and cryptography may be used to assure proper granting of access privileges within the group, and protection of data and/or communications between members of the group's secure domain. One or more groups 505, 510, 515 may be defined within a single IoT system. An administrator of the secure domain, or group authority (e.g., 520, 525), may be associated with each group. In some cases, a group authority can correspond to the user and system used to define the group. A group authority (e.g., 520) can be the administrator of one or multiple different groups (e.g., 505, 510) in the IoT system.

As depicted in FIG. 5, a particular secure domain 505 may be initially defined by a group administrator (GA) device 520. GA device 520 may define the group connectivity parameters and controls access to the group of endpoint assets (e.g., 530, 535, 540) within the secure domain 505. Connectivity parameters according to the present context include such parameters as the mode of communications, the security requirements (e.g., encryption type), the packet routing and addressing protocol, direct-memory access (DMA) addressing, service set identifier (SSID) of a WLAN, and so on. As illustrative examples, a GA device 520 may be a user computing device (e.g., a laptop, tablet, smartphone, or other device), a networking device (e.g., a WLAN router or bridge), a peripheral device interface module executing on computing hardware under control of an operating system process, a control system head end device, among other examples.

Member devices (e.g., 530, 535, 540) are endpoints and intermediary devices that have been granted access to the secure domain 505. Member devices may generally communicate amongst themselves. The set of members within a secure domain may be referred to collectively as a group. As illustrated, enrollee devices 545, 550, 555 (generally referred to individually or collectively as enrollee devices), are endpoint devices that are not yet admitted as members of the group, but are following an enrollment protocol that is managed by a group authority 505 and, in some cases, assisted using one or more delegated registrar (DR) devices 270a, 270b (generally referred to individually or collectively as DR devices 270).

In some instances, a GA device 520 may be present on an IoT network of the group 505 and may be capable of communicating directly with one or more of the assets in the network, so as to establish initial connectivity with the asset and perform enrollment directly, without the assistance of a DR device. In other instances, a DR device (e.g., 270a-b) may be utilized to establish initial connectivity with one or more enrollee endpoints (e.g., 545, 550, 555) on behalf of GA device 520. For instance, the GA device 520 may not possess the requisite functionality to communicate directly with one or more of the endpoints (e.g., 545, 550, 555), the GA may not be joined to the network, or may be otherwise unable to connect directly to an enrollee endpoint to complete enrollment of the endpoint. A trust relationship may be established between a GA device and one or more DR devices to delegate a subset of the enrollment tasks to the DR device when the GA device is unable to perform them directly. For instance, a DR device 270 may be used to initially communicate with and optionally qualify and configure enrollee devices (e.g., 545, 550, 555) to locate, communicate with, and seek admission to the group ultimately managed by the GA device 520.

Initial connectivity may be established with an enrollee device (by a GA device or DR device) using any one of a plurality of different communication technology types. For instance, initial connectivity with one enrollee endpoint (e.g., 545) may be through Bluetooth, while initial connectivity with another enrollee endpoint (e.g., 550) may be through Zigbee, etc. In some instance, the type of connectivity dictated by the group authority for the group may differ from the connectivity types utilized to establish initial connectivity with the enrollee endpoint. For instance, the group connectivity may be based on a WLAN operating under the IEEE 802.11 family of standards. These types of embodiments may advantageously provide a solution for connecting enrollee devices (e.g., 545, 550, 555) to a type of network connectivity that is not readily configurable in the absence of a user interface on the enrollee device. For example, the lack of a data-entry device may make entering an SSID for a WLAN difficult, if not impossible. However, Bluetooth and other self-configuring networks may provide a pairing process that is able to establish a secure initial connectivity through which the connectivity parameters for the group may be automatically provided to the enrollee devices (e.g., 545, 550, 555), subject to security, capability, and other qualifications, among other examples.

In instances where a DR device (e.g., 270a) is used to assist a GA device 520 with enrollment of a particular enrollee device (e.g., 545), the DR device may coordinate its enrollment activities with the GA device. The DR device may be enabled to connect to GA device 520 directly to finalize the group enrollment tasks (e.g., which the DR device is not authorized to perform by itself) for enrolling an endpoint as a member of the group (e.g., 505). In some implementations, some member devices (e.g., 530, 525, 540) may only be able communicate with a GA device 520 through an intermediary device, such as an IoT gateway. For instance, an enrollee device is unable to connect to the type of network established or supported by a GA device 520. The intermediary device, which may be DR device 270 or another member device (e.g., 535), may enable communications with the GA device during initial enrollment of the device as well as provide a compatible network for an enrollee device even after it joins the group as a member device.

Figure 6:
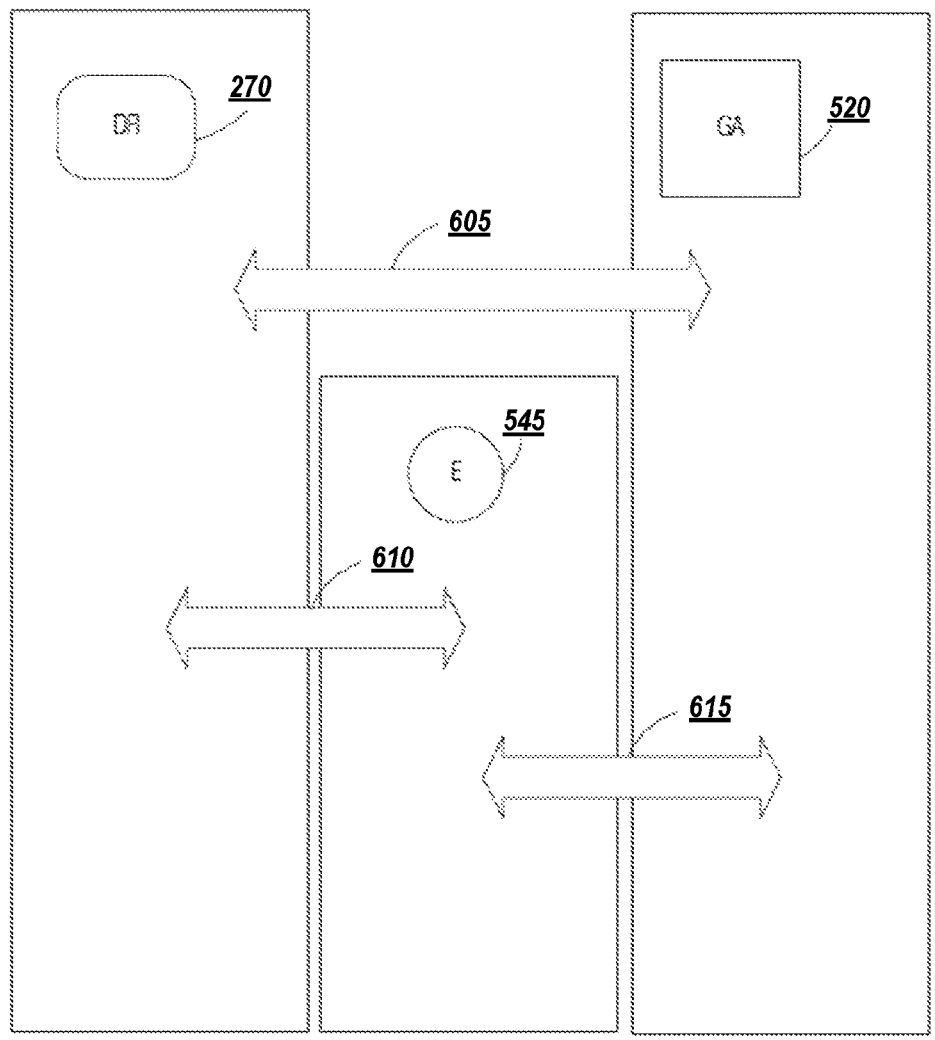
FIG. 6 is a process flow diagram illustrating an overview of a device enrollment process according to at least some embodiments.

FIG. 6 is a process flow diagram illustrating an overview of a device enrollment process carried out by GA device 520, enrollee device 545, and DR device 270 according to some embodiments. At the outset, DR 270 is established as a delegatee device at 605. Here, DR device is authenticated, registered with the group, and granted authority to operate as an initial registrar of enrollee devices. As a result, DR device 270 stores an authorizing credential for interacting with GA device 520. For example, the authorizing credential may be a secret symmetric key that is shared between DR device 270 and GA device 520.

Later, an enrollee device 545 may be identified as a potential member of a group. For instance, enrollee device 545 may be identified as a new device entering the network, or a policy may identify that a previously detected (but unbound and unenrolled) enrollee device 545 should be added to or replace other devices in the network and/or group. If the GA device 520 is able, it may interface directly with the enrollee device 545 to perform the full enrollment of the device in a corresponding group. If the GA device is unavailable or otherwise unable to communicate with the enrollee device 545, the DR device 270 can be used to establish initial communication, for instance, through an initial exchange 610 with DR device 270 to establish an initial trust relationship and to obtain limited-use credentials to be used for a group-enrollment procedure. The initial trust relationship may be established by a pairing procedure according to one type of embodiment. In a related embodiment, the trust-establishment procedure includes an automated negotiation to select a device pairing protocol from among multiple protocols that may be supported by DR device 270. The trust-establishment procedure may establish a shared secret, and an initial symmetric key based on that shared secret, for example. In some implementations, the limited-use credentials may intended to be for short-term use only (e.g., for up to 2 minutes, 10 minutes, 30 minutes, 1 hour, or some other limited time period sufficient to allow the enrollee device 545 to attempt to establish communications with the GA device 520).

In one type of embodiment, the limited-use credentials may include a pair of tokens, with the first token being based on session data of the initial connectivity, and on the initial symmetric key, and the second token being based on the session data, and on an authorizing credential (e.g., symmetric key) that represents a trust relationship between the DR device 270 and GA device 520. One or both tokens may be based on a current timestamp, which may be used to expire the limited-use credentials. The time stamp may indicate the time of the creation of the limited-use credentials, or it may indicate a future expiration time. In a related embodiment, the first token and the second token each include a common secret value that binds the two tokens to one another within the current session that binds GA device, DR device, and Enrollee device.

In some implementations, during an initial exchange 610, an enrollee device 545 may also receive group connectivity parameters for accessing GA device 520. These may include, for example, a network route to GA device 520, a service set identifier (SSID) of a wireless local area network (WLAN) through which a connection to GA device 520 is facilitated, a routing table indicating a route to GA device 520, an Internet Protocol (IP) or other network address of GA device 520, a DMA address of GA device 520, and among other example parameters and their value(s).

Subsequent to initial exchange 610, a second exchange 615 may be performed by enrollee device 545 and GA device 520, in which a group enrollment procedure is carried out. In the group-enrollment procedure, enrollee device 545 provides the limited-use credentials to GA device 520 and receives a group-access key that enables enrollee device 545 to join the secure domain as a member device, based on validation of the limited-use credentials. Interactions (e.g., 615) between an enrollee device 545 and GA device 520, in some instances, may take place over the DR device 270, with the DR device 270 acting as an intermediary device over which the enrollee device 545 and GA device 520 may communicate.

Figure 7:
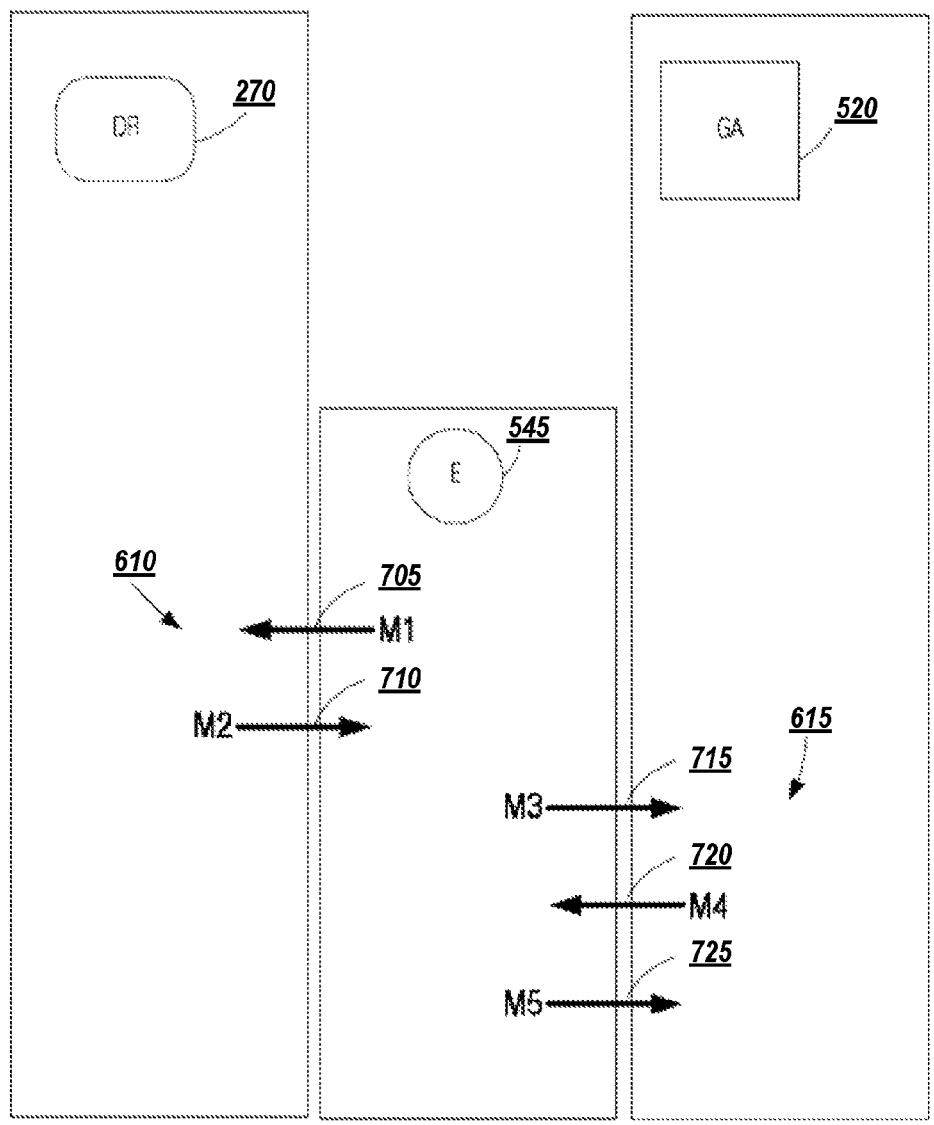
FIG. 7 is a process flow diagram illustrating a more detailed embodiment of a device-enrollment process according to at least some embodiments.

FIG. 7 is a process flow diagram illustrating a more detailed embodiment of a device-enrollment process carried out by GA 520, enrollee device 545, and DR device 270. In this example, initial exchange 610 includes a first message, M1 at 705, which is broadcast or unicast by enrollee device 545 for reception by a DR device, such as DR device 270, to request initiation of the enrollment process. In response, DR device 270 qualifies the enrollee device 545, and provides the limited-use credentials and group connectivity parameters in message M2 at 710.

In some examples, before DR device 270 responds to enrollee device 545 with limited-use credentials in message M2 at 710, DR device 270 verifies that enrollee device 545 is eligible to join the group and is authenticated to do so. The success of validation is reflected by an authorizing secret key between DR device 270 and enrollee device 545. If DR device 270 and enrollee device 545 have established a trust relationship prior to execution of the enrollment protocol, the authorizing key can be used to create and protect message M2. On the other hand, if DR device 270 and enrollee device 545 have no prior trust relationship, the devices may carry out a protocol to establish a trust relationship on demand. In an example, the negotiation and execution of a secure pairing protocol may be performed to establish trust between DR device 270 and enrollee device 545. As a result, an authorizing secret key is established to protect the limited-use credential for enrollee device 545.

Second exchange 615 in this example, may include a series of three messages, M3, M4, and M5, indicated respectively at reference numerals 715, 720, and 725. Enrollee device 545 submits the limited-use credentials to GA device 520 (e.g., over an intermediary device (e.g., DR device 270)) using message M3 at 715. GA device 520 validates the limited-use credentials by verifying that they are indeed generated from DR device 270 for the current protocol instance, and creates key material for enrollment of enrollee device 545, protected by the limited-use credentials, and transmits it to enrollee device using message M4 at 720 (e.g., over an intermediary device (e.g., DR device 270)). GA may also securely transmit a group-access key in message M4. In response, enrollee device 545 validates message M4, recovers membership key materials, confirms GA's final authorization to join the group, recovers the group-access key, and verifies successful receipt of membership credential match by composing message M5 at 725, protected with key(s) derived from the newly-established membership credential. The GA device 270 may then validate successful receipt of message M5 and confirm success of membership enrollment for enrollee device 545 in the group.

FIGS. 8A-8C, FIG. 9, and FIGS. 10A-10B are process flow diagrams illustrating actions taken by enrollee device 545, DR device 270, and GA device 520, respectively, in carrying out a device-enrollment protocol according to certain embodiments. Each process block includes detailed descriptions of constituent operations using security protocol notation, where E represents enrollee device 545, DR represents DR device 270, and GA represents GA device 520. As illustrated, operations 802 and 804 of FIG. 8A produce message M1. Operations 902-906 of FIG. 9 produce message M2. Operations 810-812 of FIG. 8B produce message M3. Operations 1002-1006 of FIG. 10A produce message M4. Operations 820 and 822 of FIG. 8C produce message M5. Operations 1010 of FIG. 10B verify the success of the enrollment of enrollee device 545.

Figure 8A:
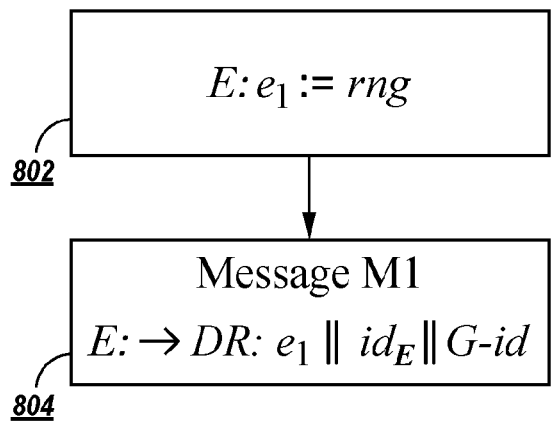

In FIG. 8A, E sends message M1 as a request for enrollment to a secure group, identified as G-id. Message M1 is sent to DR and includes a randomly generated value $e_1$, along with an identifier of E, and an identifier G-id of the group that E wishes to join.

Figure 9:
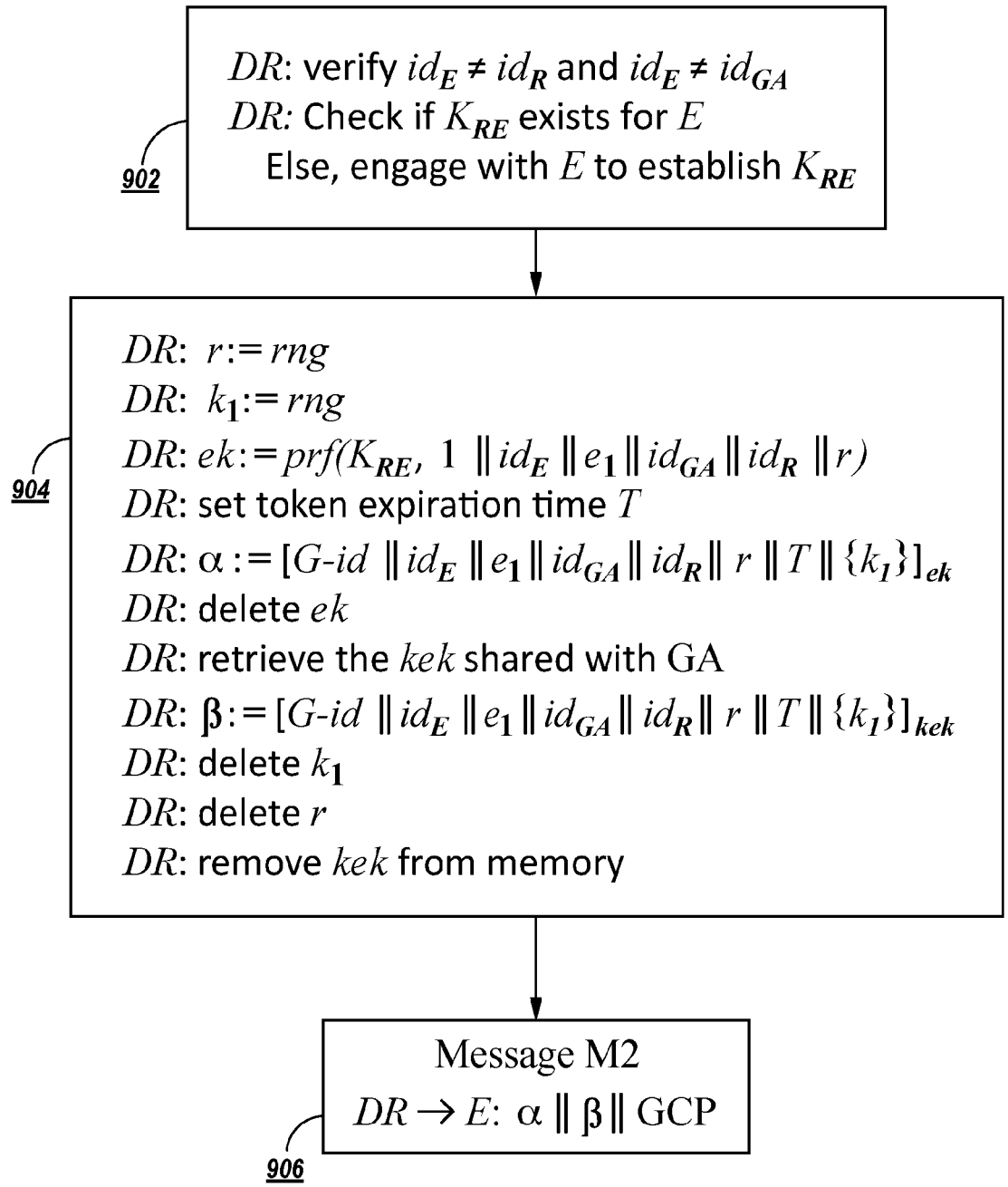

Referring to FIG. 9, at operations 902, DR parses message M1, and retrieve its contents to determine if DR and E have a prior-established trust relationship already. If E is already trusted, DR retrieves the symmetric key $K_{RE}$ that it shares with E. Otherwise, DR and E engage in an initial connectivity (e.g., pairing) protocol to establish trust on demand and an initial symmetric key $K_{RE}$ (e.g., a pairwise shared key) to be associated with the trust. The choice and negotiation of pairing method may depend on the capabilities and limitations of DR and E, as well as on group registration requirements and policy, as promulgated by GA. For instance, the DR may verify that E satisfies the requirements to be admitted as a member in the trusted group (e.g., authentication of firmware, OS integrity, security capabilities, device manufacturer/model/version, etc.).

At 904, with the establishment of $K_{RE}$, DR generates a randomly generated nonce r, and a fresh random key material (e.g., seed value) $k_1$ to be used for E's limited-use credentials. DR creates a token α for E that encrypts $k_1$ with protocol session data and current timestamp as authenticated tag, using ek, the key derived from $K_{RE}$ and protocol instance data, including identities and random number $e_1$. DR creates a token β for GA that encrypts $k_1$ with protocol session data and current timestamp as authenticated tag, using kek, the key shared by DR and GA. Tokens α and β each includes value $e_1$ and r, as well as all involved identities that associate these tokens with E. At 906, the DR device may send the two tokens, α and β, to E in message M2, along with group connectivity parameter (GCP) information for E to use to locate, and connect with, the GA device.

Figure 8B:
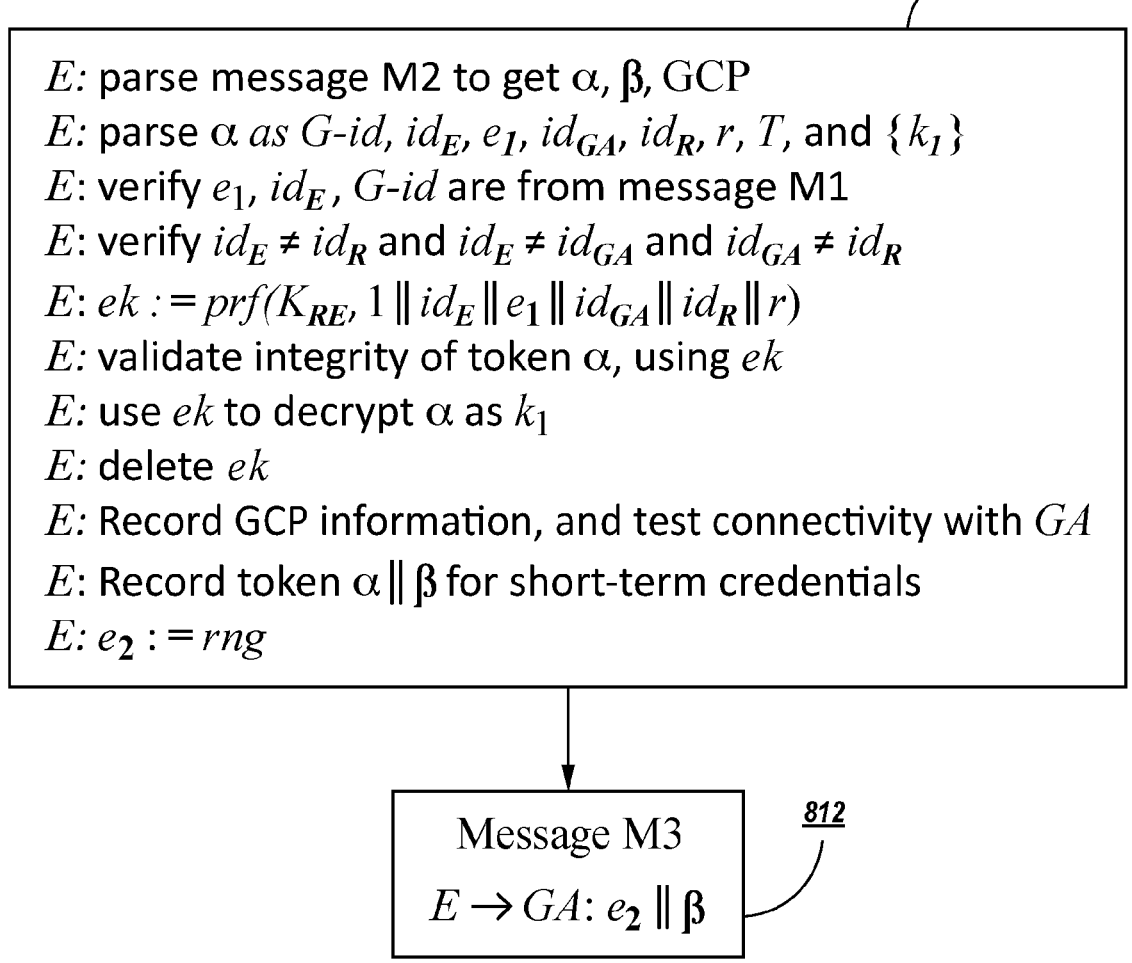

As illustrated in FIG. 8B, in operations 810, E may receive and parse message M2, and validate that the token α is authenticated with current session data. E recovers key material $k_1$ from the message, and performs various other security-related operations as detailed, including generation of random value $e_2$. At 812, E connects to GA and forwards token β to GA, in message M3, to start an exchange with GA. Message M3 also includes $e_2$.

Figure 10A:
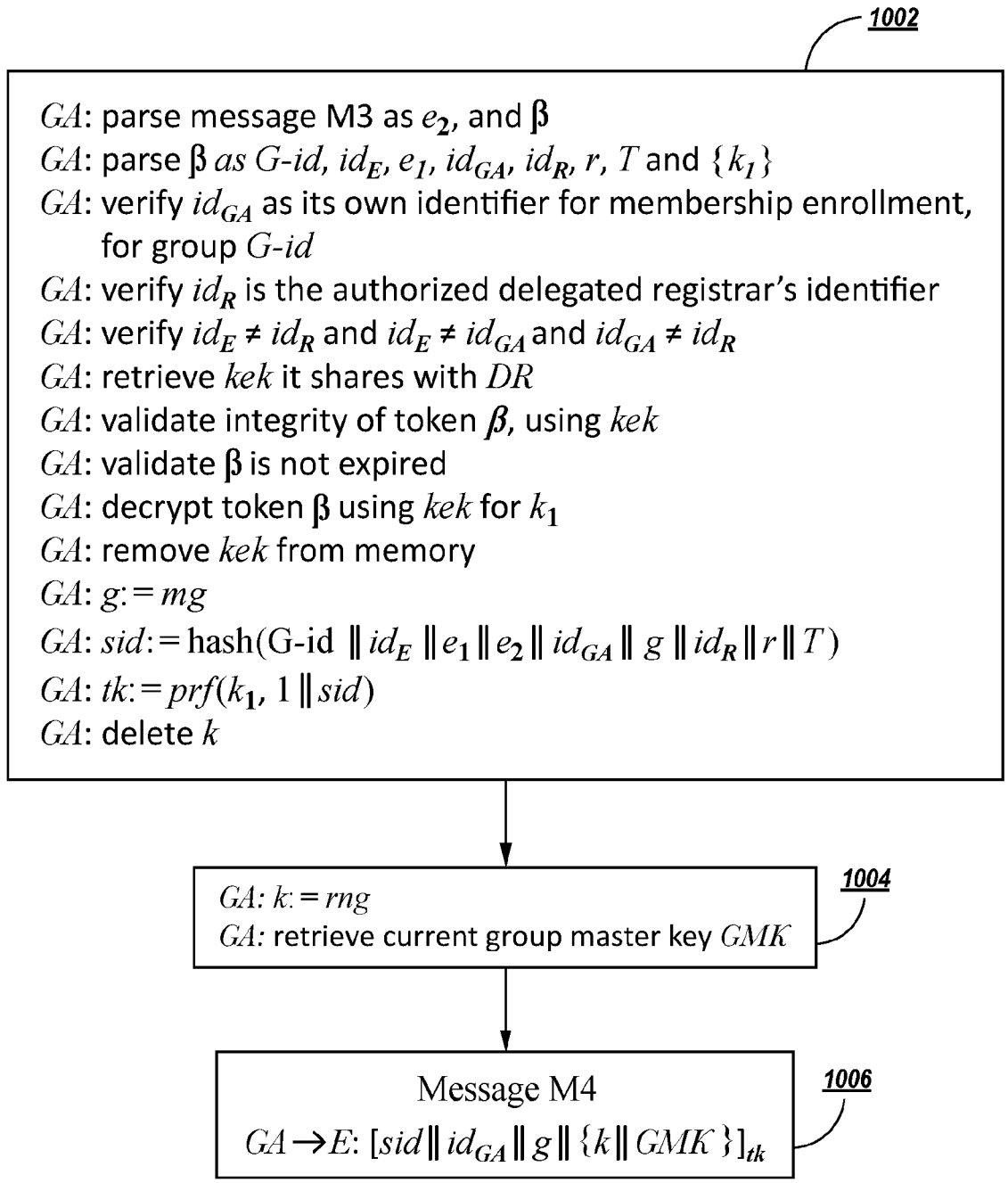

In FIG. 10A, at 1002, GA parses and validates the token β to ensure it is authenticated with current session data and is reasonably fresh according to the timestamp in the token and predefined freshness criteria. GA confirms that DR has authorized the enrollment for E by validating the authentication tag of β using kek, and recovering the same key material $k_1$. At 1004, GA issues to E persistent membership by generating a fresh key material (e.g., seed value) k. At 1006 GA sends message M4 to E, encrypted by a key tk derived from the limited-use membership credential $k_1$ as part of operations 1002. The encryption may also be authenticated with session data, with the addition of g, a randomly-generated value by GA to contribute to freshness validation in the session. In message M4, GA provides the group master key GMK to E together with k. Protection of message M4 by key material tk (derived from $k_1$) allows GA to confirm E's continued knowledge of $k_1$. The presence of random value g associates message M4 with GA.

Figure 8C:
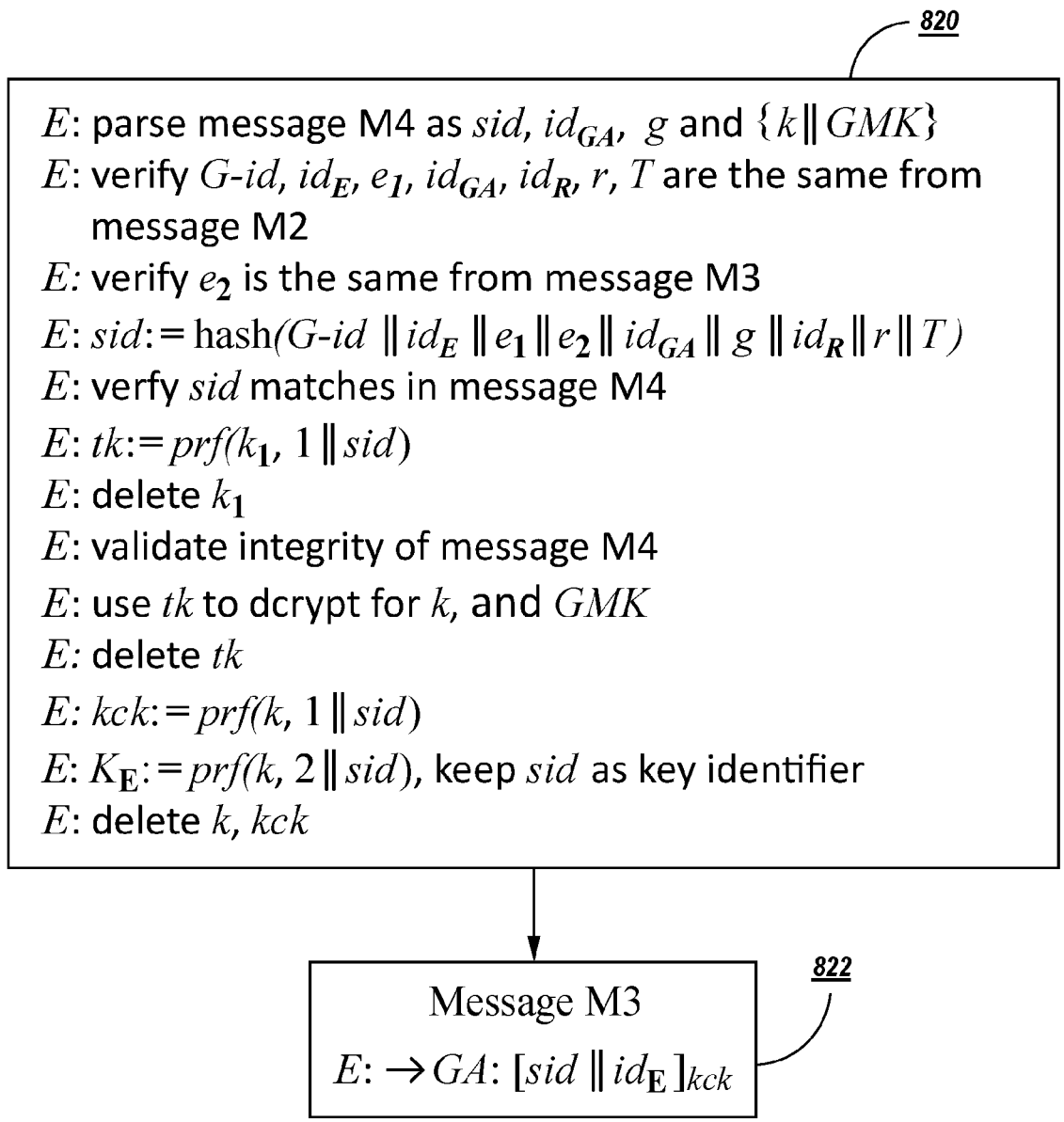

In FIG. 8C, at 820, E, with the knowledge of $k_1$, decrypts message M4 to recover new key material k and GMK. E then confirms receipt of k to GA, by composing message M5 at 822 with protection using a newly-derived key, kck, derived from k. Value sid, also included in message M5, is based on G-id, $id_E$, $e_1$, $e_2$, $id_{GA}$, g, $id_R$, r, and T, thus representing its verifiable association with the previous operations of the protocol. Further, in operations 1010 shown in FIG. 10B, GA parses and validates message M5 to confirm the successful establishment of E's membership credential and agreement with E. E's membership key is derived from the new key material k, bound with current authenticated session data. The process flow diagrams of FIGS. 8A-8C, 9, and 10A-10B illustrate an example process that is a richly-featured embodiment that may be realized as described; in addition, portions of the process may be implemented while others are optional, or excluded, in various embodiments. It should also be noted that in various embodiments, certain process operations may be performed in a different ordering and according to different algorithms and formulas than depicted in FIGS. 8A-8C, 9, and 10A-10B, provided that the logical flow and integrity of the process is not disrupted in substance.

While some of the systems and solution described and illustrated herein have been described as containing or being associated with a plurality of elements, not all elements explicitly illustrated or described may be utilized in each alternative implementation of the present disclosure. Additionally, one or more of the elements described herein may be located external to a system, while in other instances, certain elements may be included within or as a portion of one or more of the other described elements, as well as other elements not described in the illustrated implementation. Further, certain elements may be combined with other components, as well as used for alternative or additional purposes in addition to those purposes described herein.

Further, it should be appreciated that the examples presented above are non-limiting examples provided merely for purposes of illustrating certain principles and features and not necessarily limiting or constraining the potential embodiments of the concepts described herein. For instance, a variety of different embodiments can be realized utilizing various combinations of the features and components described herein, including combinations realized through the various implementations of components described herein. Other implementations, features, and details should be appreciated from the contents of this Specification.

Figure 11:
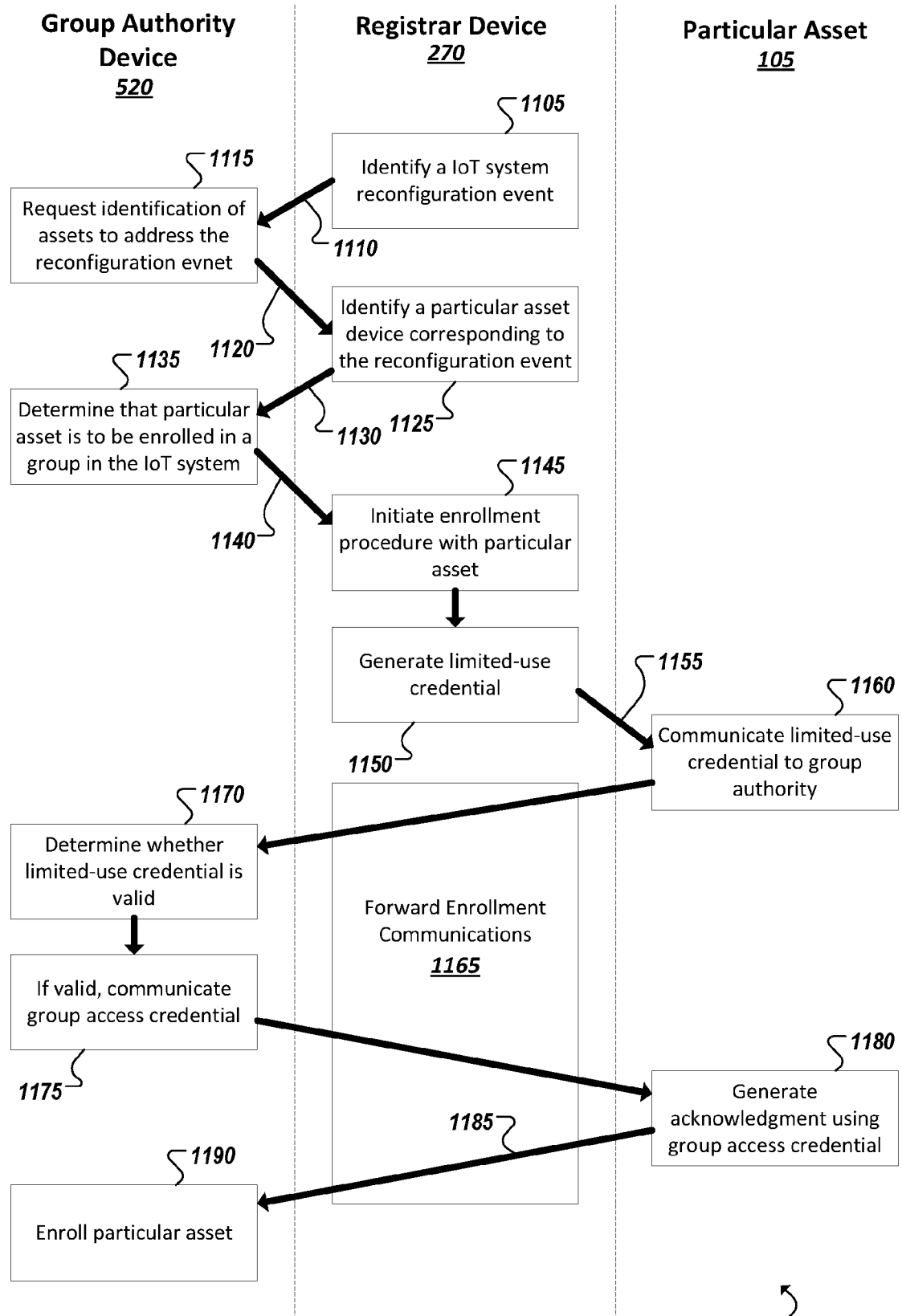
FIG. 11 is a flowchart illustrating an example technique for using a registrar device to perform delegated enrollment of an asset in connection with a reconfiguration of an IoT system.

FIG. 11 is a simplified flowchart 1100 illustrating an example technique for using a registrar device to perform delegated enrollment of an asset in connection with a reconfiguration of an IoT system. In the example of FIG. 11, a registrar device 270 may be provisioned with an authorizing credential (e.g., a symmetric key) during a designation of the registrar device 270 as an authorized delegate of enrollment authority by the group authority (GA) device 520. In some cases, the registrar device 270 may perform initial enrollment tasks on behalf of the GA device 520. These initial enrollment tasks may be delegated to the registrar device 270 for use in all asset group enrollments, or may be selectively engaged (e.g., by the GA device or an asset) when the GA device is unable to communicate directly with an enrollee device (e.g., 105). In one example, the registrar device 270 may detect 1105 a reconfiguration event within a deployed IoT system. A reconfiguration event may be the discovery of a new asset communicable with the IoT system network or the registrar device and correspond to an opportunity to add the new asset to the IoT system. Another reconfiguration event example may be detection of a device failure to trigger a failover reconfiguration, among other examples. The circumstances of the event (e.g., a device failure, new device on the network, etc.) may be detected by the registrar device 270 and reported 1110 to the GA device 1115. The GA device 1115 may respond to the reconfiguration event with a request 1115 for more information concerning the availability of devices on the network that may be added to the IoT system to address the reconfiguration event. This may include the identification of a newly joined asset, identification of a new or previously detected asset that may supplement or replace another asset in the system (based on an asset abstraction of an IoT system), or identification of a new or previously detected asset that addresses a new requirement of the application (e.g., as specified by an asset abstraction defined or added to the application logic), among other examples. This request 1115 can be communicated 1120 to the registrar device and the registrar device 1125 may identify an asset (e.g., 105) that satisfies the request 1115.

Continuing with the example able, the registrar device 270 may send data 1130 indicating the identified (at 1125) asset (e.g., 105) to the GA device 520. In some cases, this data 1130 may be sent by the register device 270 automatically in response to detecting an asset or change to a deployment (e.g., and not in response to a specific request for information from the GA device 520). In either case, the GA device 520 may determine 1135 whether the identified device should be enrolled within one or more groups defined within the IoT system. In such an example, the GA device 520 may communicate (at 1140) a request to the registrar device 270 to initiate enrollment of the asset based on the determination 1135 of the GA device 520. In other instances, the registrar device 270 may initiate enrollment procedure in connection with its initial discovery and/or communication with an asset (i.e., without an explicit instruction from the GA device 520), with the GA device 520 capable of canceling the enrollment procedure if the discovered device is not to be included in the group. Indeed, in some implementations, an initial discovery of an asset and the initiation of enrollment of the asset can cause a prompt to be displayed to a user (e.g., of the GA device or a client interfacing with the GA device) to identify the discovered asset and allow a user to deny or accept a discovered asset's enrollment within one or more defined groups in an IoT system, among other examples.

A registrar device may initiate an enrollment procedure 1145 by communicating with the particular asset and determining or establishing a trust relationship with the particular asset. Information concerning the session or initial communication may be utilized as a shared secret to allow the registrar device 270 and particular asset 105 to negotiate another credential corresponding to their trust relationship. The credential may be used, together with an authorizing credential corresponding to the relationship between the GA device and registrar device 270, to generate 1150 a limited-use credential for use in the enrollment of the particular asset 105. The limited-use credential can be communicated 1155 to the particular asset 105 and the particular asset 105 can use the limited-use credential to complete enrollment with the GA device 520. For instance, the particular asset 105 can communicate 1160 the limited-use credential to the GA device 520. Communications (e.g., 1160, 1180, 1190) between the GA device 520 and the particular asset 105 may be facilitated by the registrar device, which acts as an intermediary and forward messages between the GA device 520 and the particular asset 105. Upon receiving the limited-use credential, the GA device 520 can determine whether the limited-use credential is valid (e.g., based on whether the limited-use credential has been signed by the authorizing credential corresponding to the relationship between the GA device and registrar device) and if it is (and the GA device confirms that the asset is to be enrolled in the group), the GA device can send (at 1175) the group access credential to the asset 105 to allow the asset to join the group (e.g., and participate in secure communications with other group members). The asset 105 can use the received group access credential to generate 1180 an acknowledgment (e.g., signed by the group access credential) to confirm (at 1185) to the GA device that the asset 105 is in possession of the group access credential and possesses logic to successfully utilize it. The GA device may then finalize enrollment 1190 of the asset 105 in the group based on the acknowledgement.

Figure 12:
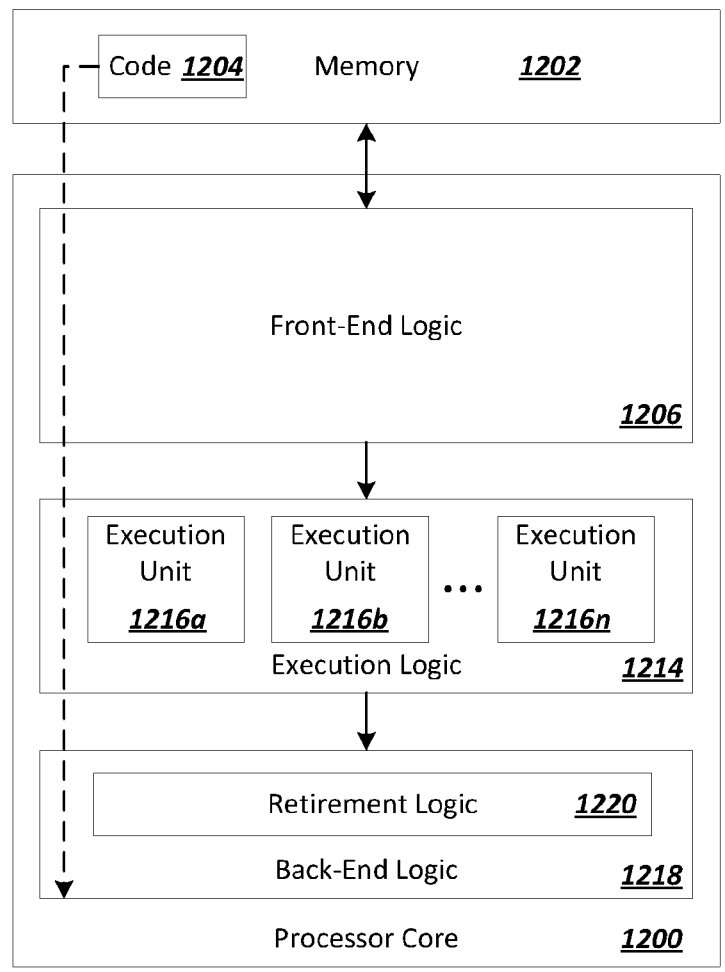
FIG. 12 is a block diagram of an exemplary processor in accordance with one embodiment.
Figure 13:
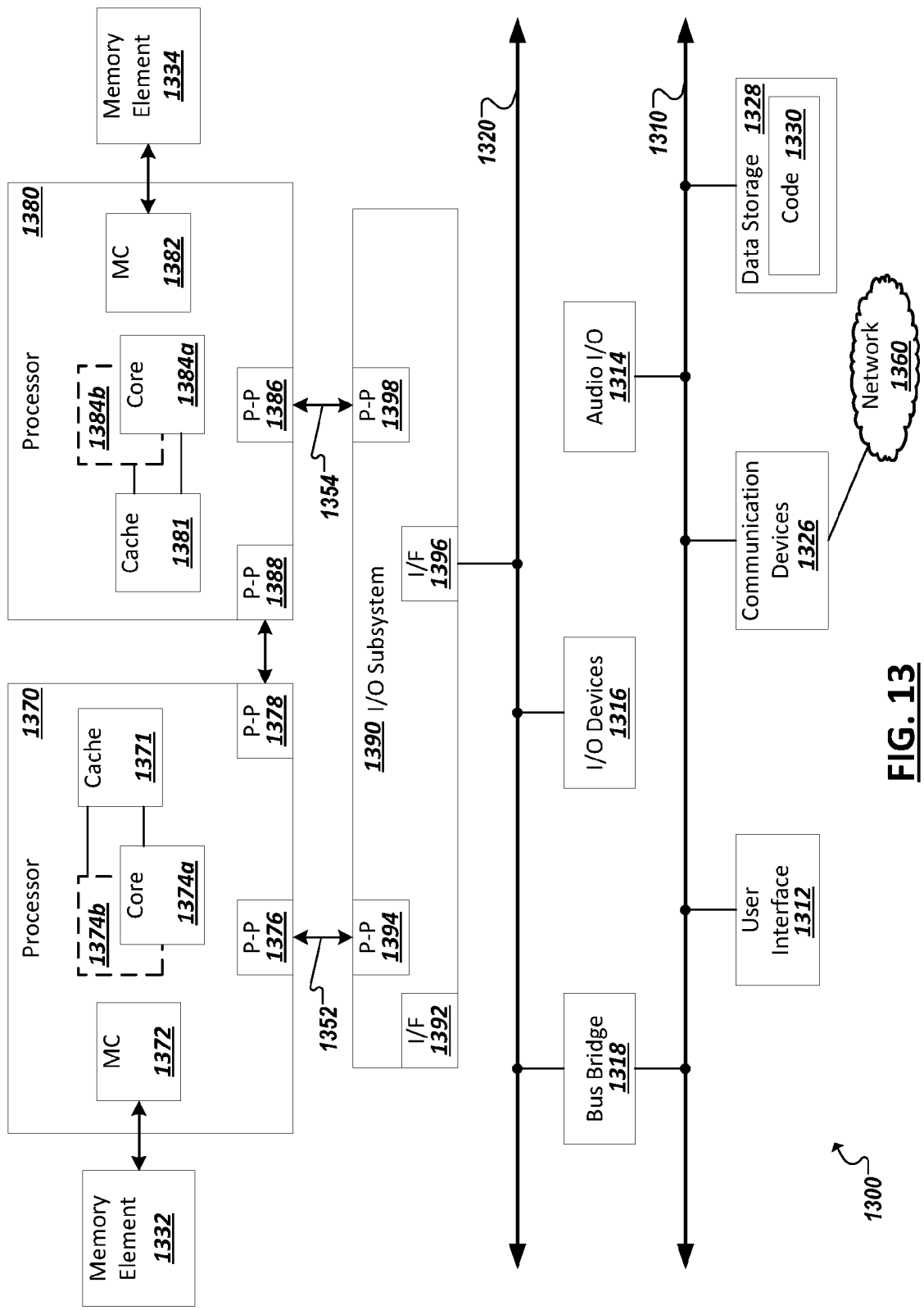
FIG. 13 is a block diagram of an exemplary computing system in accordance with one embodiment.

FIGS. 12-13 are block diagrams of exemplary computer architectures that may be used in accordance with embodiments disclosed herein. Other computer architecture designs known in the art for processors and computing systems may also be used. Generally, suitable computer architectures for embodiments disclosed herein can include, but are not limited to, configurations illustrated in FIGS. 12-13.

FIG. 12 is an example illustration of a processor according to an embodiment. Processor 1200 is an example of a type of hardware device that can be used in connection with the implementations above. Processor 1200 may be any type of processor, such as a microprocessor, an embedded processor, a digital signal processor (DSP), a network processor, a multi-core processor, a single core processor, or other device to execute code. Although only one processor 1200 is illustrated in FIG. 12, a processing element may alternatively include more than one of processor 1200 illustrated in FIG. 12. Processor 1200 may be a single-threaded core or, for at least one embodiment, the processor 1200 may be multi-threaded in that it may include more than one hardware thread context (or "logical processor") per core.

FIG. 12 also illustrates a memory 1202 coupled to processor 1200 in accordance with an embodiment. Memory 1202 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Processor 1200 can execute any type of instructions associated with algorithms, processes, or operations detailed herein. Generally, processor 1200 can transform an element or an article (e.g., data) from one state or thing to another state or thing.

Code 1204, which may be one or more instructions to be executed by processor 1200, may be stored in memory 1202, or may be stored in software, hardware, firmware, or any suitable combination thereof, or in any other internal or external component, device, element, or object where appropriate and based on particular needs. In one example, processor 1200 can follow a program sequence of instructions indicated by code 1204. Each instruction enters a front-end logic 1206 and is processed by one or more decoders 1208. The decoder may generate, as its output, a micro operation such as a fixed width micro operation in a predefined format, or may generate other instructions, microinstructions, or control signals that reflect the original code instruction. Front-end logic 1206 also includes register renaming logic 1210 and scheduling logic 1212, which generally allocate resources and queue the operation corresponding to the instruction for execution.

Processor 1200 can also include execution logic 1214 having a set of execution units 1216a, 1216b, 1216n, etc. Some embodiments may include a number of execution units dedicated to specific functions or sets of functions. Other embodiments may include only one execution unit or one execution unit that can perform a particular function. Execution logic 1214 performs the operations specified by code instructions.

After completion of execution of the operations specified by the code instructions, back-end logic 1218 can retire the instructions of code 1204. In one embodiment, processor 1200 allows out of order execution but requires in order retirement of instructions. Retirement logic 1220 may take a variety of known forms (e.g., re-order buffers or the like). In this manner, processor 1200 is transformed during execution of code 1204, at least in terms of the output generated by the decoder, hardware registers and tables utilized by register renaming logic 1210, and any registers (not shown) modified by execution logic 1214.

Although not shown in FIG. 12, a processing element may include other elements on a chip with processor 1200. For example, a processing element may include memory control logic along with processor 1200. The processing element may include I/O control logic and/or may include I/O control logic integrated with memory control logic. The processing element may also include one or more caches. In some embodiments, non-volatile memory (such as flash memory or fuses) may also be included on the chip with processor 1200.

FIG. 13 illustrates a computing system 1300 that is arranged in a point-to-point (PtP) configuration according to an embodiment. In particular, FIG. 13 shows a system where processors, memory, and input/output devices are interconnected by a number of point-to-point interfaces. Generally, one or more of the computing systems described herein may be configured in the same or similar manner as computing system 1300.

Processors 1370 and 1380 may also each include integrated memory controller logic (MC) 1372 and 1382 to communicate with memory elements 1332 and 1334. In alternative embodiments, memory controller logic 1372 and 1382 may be discrete logic separate from processors 1370 and 1380. Memory elements 1332 and/or 1334 may store various data to be used by processors 1370 and 1380 in achieving operations and functionality outlined herein.

Processors 1370 and 1380 may be any type of processor, such as those discussed in connection with other figures. Processors 1370 and 1380 may exchange data via a point-to-point (PtP) interface 1350 using point-to-point interface circuits 1378 and 1388, respectively. Processors 1370 and 1380 may each exchange data with a chipset 1390 via individual point-to-point interfaces 1352 and 1354 using point-to-point interface circuits 1376, 1386, 1394, and 1398. Chipset 1390 may also exchange data with a high-performance graphics circuit 1338 via a high-performance graphics interface 1339, using an interface circuit 1392, which could be a PtP interface circuit. In alternative embodiments, any or all of the PtP links illustrated in FIG. 13 could be implemented as a multi-drop bus rather than a PtP link.

Chipset 1390 may be in communication with a bus 1320 via an interface circuit 1396. Bus 1320 may have one or more devices that communicate over it, such as a bus bridge 1318 and I/O devices 1316. Via a bus 1310, bus bridge 1318 may be in communication with other devices such as a user interface 1312 (such as a keyboard, mouse, touchscreen, or other input devices), communication devices 1326 (such as modems, network interface devices, or other types of communication devices that may communicate through a computer network 1360), audio I/O devices 1314, and/or a data storage device 1328. Data storage device 1328 may store code 1330, which may be executed by processors 1370 and/or 1380. In alternative embodiments, any portions of the bus architectures could be implemented with one or more PtP links.

The computer system depicted in FIG. 13 is a schematic illustration of an embodiment of a computing system that may be utilized to implement various embodiments discussed herein. It will be appreciated that various components of the system depicted in FIG. 13 may be combined in a system-on-a-chip (SoC) architecture or in any other suitable configuration capable of achieving the functionality and features of examples and implementations provided herein.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Additionally, other user interface layouts and functionality can be supported. Other variations are within the scope of the following claims.

In general, one aspect of the subject matter described in this specification can be embodied in methods and executed instructions that include or cause the actions of identifying a sample that includes software code, generating a control flow graph for each of a plurality of functions included in the sample, and identifying, in each of the functions, features corresponding to instances of a set of control flow fragment types. The identified features can be used to generate a feature set for the sample from the identified features These and other embodiments can each optionally include one or more of the following features. The features identified for each of the functions can be combined to generate a consolidated string for the sample and the feature set can be generated from the consolidated string. A string can be generated for each of the functions, each string describing the respective features identified for the function. Combining the features can include identifying a call in a particular one of the plurality of functions to another one of the plurality of functions and replacing a portion of the string of the particular function referencing the other function with contents of the string of the other function. Identifying the features can include abstracting each of the strings of the functions such that only features of the set of control flow fragment types are described in the strings. The set of control flow fragment types can include memory accesses by the function and function calls by the function. Identifying the features can include identifying instances of memory accesses by each of the functions and identifying instances of function calls by each of the functions. The feature set can identify each of the features identified for each of the functions. The feature set can be an n-graph.

Further, these and other embodiments can each optionally include one or more of the following features. The feature set can be provided for use in classifying the sample. For instance, classifying the sample can include clustering the sample with other samples based on corresponding features of the samples. Classifying the sample can further include determining a set of features relevant to a cluster of samples. Classifying the sample can also include determining whether to classify the sample as malware and/or determining whether the sample is likely one of one or more families of malware. Identifying the features can include abstracting each of the control flow graphs such that only features of the set of control flow fragment types are described in the control flow graphs. A plurality of samples can be received, including the sample. In some cases, the plurality of samples can be received from a plurality of sources. The feature set can identify a subset of features identified in the control flow graphs of the functions of the sample. The subset of features can correspond to memory accesses and function calls in the sample code.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The following examples pertain to embodiments in accordance with this Specification. One or more embodiments may provide a method, a system, apparatus, and a machine readable storage medium with stored instructions executable to implement a registrar with access to a local authorizing credential. The registrar is to identify a particular asset device in association with a reconfiguration of a machine-to-machine (M2M) system that includes a plurality of asset devices and a defined group comprising at least a portion of the plurality of asset devices. A group authority device is designated as a group authority for the group and the authorizing credential corresponds to a trust relationship with the group authority device. An enrollment request is identified for enrollment of the particular asset device within the group of devices in association with the reconfiguration of the M2M system, and the registrar communicates with the particular device to initiate enrollment of the particular device within the group of devices, where enrollment of the particular device includes provisioning the particular device with a group access credential.

In one example, the registrar is further to determine that the group authority device is unable to communicate directly with the particular device, and communication by the registrar with the particular device to initiate enrollment of the particular device within the group is based on determining that the group authority device is unable to communicate directly with the particular device.

In one example, the registrar is further to detect a failure event involving a first one of the asset devices in the group and identify the failure event to the group authority, where the reconfiguration is responsive to the failure event.

In one example, the particular device is to replace the first device in the group and enrollment of the particular device in the group is responsive to the failure event.

In one example, the registrar is further to determine that the particular asset device is a device of a particular one of a plurality of device types, where the particular asset device is to be enrolled in the group based at least in part on the particular asset device being of the particular type.

In one example, the particular device type corresponds to a particular asset abstraction requirement of an application, and the application is to use the M2M system.

In one example, the registrar is further to detect that the particular asset device enters the network, and identify entry of the particular asset device in the network to the group authority, where the reconfiguration is responsive to the entry of the particular asset device.

In one example, initiating enrollment of the particular asset device includes participating in generation of a limited-use credential based on the authorizing credential, and provisioning of the group access credential is to be based on validation of the limited-use credential by the group authority.

In one example, validation of the limited-use credential by the group authority includes communications between the group authority device and particular asset device sent over the registrar.

In one example, communications between the group authority device and particular asset device includes sending of the limited-use credential from the particular asset device to the group authority device, sending of the group access credential from the group authority device to the particular asset device, based on validation of the limited-use credential by the group authority, and sending of an acknowledgment from the particular asset device to the group authority device, where the acknowledgement is generated using the group access credential.

In one example, the limited-use credential is further based on an initial symmetric key based on a shared secret between the registrar and the particular asset device.

In one example, the shared secret includes information describing an initial connection between the registrar and the particular asset device.

In one example, the group authority is associated with an administrator user associated with definition of the group.

In one example, the authorizing credential is provisioned in the memory based on an authentication of the registrar by the group authority.

In one example, the enrollment request is received from the group authority device.

In one example, the enrollment request is received from the particular asset device.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. An apparatus comprising:
   a memory to store an authorizing credential; and
   a registrar comprising logic executable to:
      identify a particular asset device in association with a reconfiguration of a machine-to-machine (M2M) system, wherein the M2M system comprises a plurality of asset devices and a defined group comprising at least a portion of the plurality of asset devices, a group authority device is designated as a group authority for the group, and the authorizing credential corresponds to a trust relationship between the registrar and the group authority device, wherein the authorizing credential corresponds to a group enrollment authorization delegated to the registrar from the group authority device;
      receive an enrollment request for enrollment of the particular asset device with the group of devices in association with the reconfiguration of the M2M system;

determine that the group authority device is unavailable to initiate enrollment of the particular asset device with the group of devices; and communicate with the particular asset device to initiate enrollment of the particular asset device within the group of devices and provision the particular asset device with a limited use credential based on determination that the group authority device is unavailable to initiation enrollment, wherein the limited use credential is to be used by the particular asset device in subsequent communication with the group authority device to finalize enrollment of the particular asset device with the group.

2. The apparatus of claim 1, wherein communication by the registrar with the particular asset device to initiate enrollment of the particular asset device within the group is based on determining that the group authority device is unable to communicate directly with the particular asset device.

3. The apparatus of claim 1, wherein the registrar is further to:
detect a failure event involving a first one of the asset devices in the group; and
identify the failure event to the group authority device, wherein the reconfiguration is responsive to the failure event.

4. The apparatus of claim 3, wherein the particular asset device is to replace the first device in the group and enrollment of the particular asset device in the group is responsive to the failure event.

5. The apparatus of claim 1, wherein the registrar is further to:
determine that the particular asset device is a device of a particular one of a plurality of device types, wherein the particular asset device is to be enrolled in the group based at least in part on the particular asset device being of the particular type.

6. The apparatus of claim 5, wherein the particular type corresponds to a particular asset abstraction requirement of an application, and the application is to use the M2M system.

7. The apparatus of claim 1, wherein the registrar is further to:
detect that the particular asset device enters range of a wireless network associated with the group;
identify entry of the particular asset device in the network to the group authority,
wherein the reconfiguration is responsive to the entry of the particular asset device within the range of the wireless network.

8. The apparatus of claim 1, wherein provisioning of the limited use credential comprises determining attributes of the particular asset device and determining the limited use credential.

9. The apparatus of claim 1, wherein the subsequent communications comprises communications between the group authority device and particular asset device sent over the registrar.

10. The apparatus of claim 9, wherein the subsequent communications between the group authority device and particular asset device comprise:
sending of the limited-use credential from the particular asset device to the group authority device;
sending of a group access credential from the group authority device to the particular asset device, based on validation of the limited-use credential by the group authority; and sending of an acknowledgment from the particular asset device to the group authority device, wherein the acknowledgement is generated using the group access credential.

11. The apparatus of claim 1, wherein the limited-use credential is based on an initial symmetric key based on a shared secret between the registrar and the particular asset device.

12. The apparatus of claim 11, wherein the shared secret comprises information describing an initial connection between the registrar and the particular asset device.

13. The apparatus of claim 1, wherein the group authority device is associated with an administrator user associated with definition of the group.

14. The apparatus of claim 1, wherein the authorizing credential is provisioned in the memory based on an authentication of the registrar by the group authority.

15. A method comprising:
maintaining an authorizing credential at a registrar device, wherein the authorizing credential corresponds to a trust relationship partial delegation of enrollment authority by a group authority device to the registrar device, wherein the group authority device is designated as a group authority for a particular group within a machine-to-machine (M2M) system comprising a plurality of asset devices, and the group comprises at least a subset of the plurality of asset devices and the registrar device;
identifying a particular asset device in association with a reconfiguration of the M2M system, wherein reconfiguration of the M2M system comprises an addition of the particular asset device to the M2M system;
receiving an enrollment request for enrollment of the particular asset device within the group in association with the reconfiguration of the M2M system;
determining that the group authority device is unavailable to initiate enrollment of the particular asset device with the group of devices; and
communicating with the particular asset device to initiate enrollment the particular asset device in the group of devices by the registrar device based on unavailability of the group authority device, wherein initiating enrollment of the particular asset device comprises the registrar device provisioning the particular asset device with a limited use credential, wherein the limited use credential is to be used by the particular asset device in subsequent communication with the group authority device to finalize enrollment of the particular asset device with the group.

16. The method of claim 15, wherein the enrollment request is received from the group authority device at the registrar device.

17. The method of claim 15, wherein the enrollment request is received from the particular asset device.

18. A system comprising:
a group authority device designated as a group authority for a particular group within a machine-to-machine (M2M) system comprising a plurality of asset devices, wherein enrollment of new asset devices in the M2M system is governed by the group authority device, and the group comprises at least a subset of the plurality of asset devices; and
a registrar device, to which at least a portion of enrollment authority is delegated by the group authority based on an authorizing key provisioned on the registrar device through communication with the group authority device, wherein the registrar device is to:

identify a reconfiguration event affecting the M2M system;

detect a particular asset device on a network, wherein the particular asset device is to be added to the M2M system in association with the reconfiguration event;

receive an enrollment request for enrollment of the particular asset device in the group in association with the reconfiguration of the M2M system;

participate in a trust-establishment procedure with the particular asset device to generate a limited-use credential for the particular asset; and facilitate communication of the limited-use credential from the particular asset device to the group authority device to assist in enrollment of the particular asset device in the group, wherein the group authority device is to finalize enrollment of the particular asset device based at least in part on the limited-use credential.

19. The system of claim 18, further comprising:

the subset of devices; and an Internet of Things (IoT) software application to use the subset of devices.

20. The system of claim 19, wherein the subset of devices are automatically selected for inclusion in the M2M system based on asset abstraction requirements defined in the IoT software application, and the particular asset device is of a type corresponding to a particular one of the asset abstraction requirements.

* * * * *